(12) United States Patent
Herberg et al.

(10) Patent No.: US 9,703,570 B2
(45) Date of Patent: Jul. 11, 2017

(54) DYNAMIC DEVICE DRIVERS

(71) Applicant: FUJITSU LIMITED, Kawasaki-shi, Kanagawa (JP)

(72) Inventors: Ulrich Herberg, Santa Clara, CA (US); Mohammad-Mahdi Moazzami, Mountain View, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/504,302

(22) Filed: Oct. 1, 2014

(65) Prior Publication Data

US 2016/0098284 A1    Apr. 7, 2016

(51) Int. Cl.
G06F 3/00      (2006.01)
G06F 9/44      (2006.01)
G06F 9/46      (2006.01)
G06F 13/00     (2006.01)

(52) U.S. Cl.
CPC .......... *G06F 9/4411* (2013.01); *G06F 9/4443* (2013.01)

(58) Field of Classification Search
None
See application file for complete search history.

(56) References Cited

U.S. PATENT DOCUMENTS

| | | | | |
|---|---|---|---|---|
| 6,968,471 B2 * | 11/2005 | Daum | ........................ | G06F 1/14 713/400 |
| 7,092,950 B2 * | 8/2006 | Wong | .................. | G06F 17/2205 |
| 7,895,257 B2 | 2/2011 | Helal et al. | | |
| 2005/0246722 A1 * | 11/2005 | Shier | ..................... | G06F 13/102 719/321 |
| 2006/0136546 A1 * | 6/2006 | Trioano | ................. | G06Q 30/02 709/203 |
| 2007/0236346 A1 * | 10/2007 | Helal | .................. | H04L 12/2803 340/539.22 |

(Continued)

OTHER PUBLICATIONS

C. Dixon et al., "The Home Needs an Operating System (and an App Store)" http://research.microsoft.com/apps/pubs/default.aspx?id=136890, Oct. 20-21, 2010.

(Continued)

*Primary Examiner* — Tuan Dao
*Assistant Examiner* — William C Wood
(74) *Attorney, Agent, or Firm* — Maschoff Brennan

(57) ABSTRACT

A method includes receiving a driver model for a device. The driver model includes a list of variables associated with the device and one or more characteristics of the variables. The method includes determining whether the driver model is format-compliant and validating syntax of the driver model based at least partially on a driver template that is accessible to a third party. In response to the driver model being format-compliant and the syntax being valid, the method includes generating a verified file that is representative of the driver model. The verified file is formatted to dynamically load into a device application module during operation and to dynamically support the device. The method includes communicating the verified file to a user apparatus and adding an integrity check value thereto. In response to the driver model being format-noncompliant or the syntax being invalid, the method includes communicating an error message.

20 Claims, 15 Drawing Sheets

(56) References Cited

U.S. PATENT DOCUMENTS

| | | | | |
|---|---|---|---|---|
| 2007/0298389 A1* | 12/2007 | Yu | ............................ | G09B 5/06 |
| | | | | 434/188 |
| 2009/0144514 A1* | 6/2009 | Lamantia | .................. | G06F 8/63 |
| | | | | 711/161 |
| 2011/0055806 A1* | 3/2011 | Chicherin | ................. | G06F 8/75 |
| | | | | 717/106 |
| 2011/0246645 A1* | 10/2011 | Martin | ..................... | G09B 7/02 |
| | | | | 709/224 |
| 2013/0246631 A1* | 9/2013 | Gonzales | ........... | H04N 21/6405 |
| | | | | 709/227 |
| 2014/0082622 A1* | 3/2014 | Yang | ....................... | G06F 9/445 |
| | | | | 718/100 |
| 2014/0282140 A1* | 9/2014 | Balogh | ................. | G06F 3/0486 |
| | | | | 715/765 |

OTHER PUBLICATIONS

HomeKit Apple Inc., https://developer.apple.com/homekit/ Retrieved Oct. 1, 2014.

* cited by examiner

300

```xml
<?xml version= "1.0" encoding="UTF-8"?>
<driver>
        <driver_type>HVAC</driver_type>                    302
        <driver_name>Vendor X's HVAC system</driver_name>  304
        <driver_version>1.0</driver_version>               306
        <variables>
                <variable>
                        <name>thermostat_name</name>           312A
                        <variable_type>string</variable_type>
                </variable>
                <variable>
                        <name>current_temp</name>              312B
                        <variable_type>float</variable_type>
                </variable>
                <variable>
                        <name>heating_setpoint</name>          312C
                        <variable_type>float</variable_type>
                </variable>
                <variable>
                        <name>cooling_setpoint</name>          312D
                        <variable_type>float</variable_type>
                </variable>
                <variable>
                        <name>mode</name>                      312E
                        <variable_type>int</variable_type>     312F
                        <minimum_value>0</minimum_value>       312G
                        <maximum_value>1</maximum_value>
                <variable>
                <variable>
                        <name>fan</name>                       312H
                        <variable_type>int</variable_type>     312I
                        <minimum_value>0</minimum_value>       312J
                        <maximum_value>1</maximum_value>
                <variable>
        <variables>
```

```
<set>
    <http_uri> https://server.cloudprovider.com/control?mode=$mode&fan=$fan&
        heattemp=$heating_setpoint&cooltemp=$cooling_setpoint </http_uri>
    <http_version>1.1</http_version>
    <http_type>POST</http_type>
    <http_body_type>JSON</http_body_type>
    <http_header>Content-Type: application/x-www-form-urlencoded</http_header>
    <http_body></http_body>
</set>
<get>
    <http_uri>https://server.cloudprovider.com/query/sensors</http_uri>
    <http_type>GET</http_type>
    <http_body>
        {
            "sensors": [
                {
                    "name": $thermostat_name,
                    "temp": $current_temp
                }
            ]
        }
    </http_body>
</get>
</driver>
```

DYNAMIC DEVICE DRIVERS

FIELD

The embodiments discussed herein are related to dynamic device drivers.

BACKGROUND

Smart devices may be implemented in environments to perform some function. For example, smart thermostats may be implemented in a residential environment to maintain a comfortable temperature in the residential environment. The smart devices are often controlled by a control device. The control device may communicate with the smart devices via a computer network. However, the smart devices communicate using a variety of protocols, which may be proprietary. Applications that communicate with such smart devices may be limited to a few smart devices. Accordingly, controlling multiple smart devices or multiple sets of smart devices may involve multiple applications loaded onto the control devices.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method includes receiving a driver model for a device from a third party. The driver model includes a list of variables associated with the device and one or more characteristics of the variables. The method also includes determining whether the driver model is format-compliant. The method includes validating syntax of the driver model based at least partially on a driver template that is accessible to the third party. In response to the driver model being format-compliant and the syntax being valid, the method includes generating a verified file that is representative of the driver model. The verified file is formatted to dynamically load into a device application module during operation and to dynamically support the device. The method further includes communicating the verified file to a user apparatus that includes the device application module and adding an integrity check value to the verified file. In response to the driver model being format-noncompliant or the syntax being invalid, the method includes communicating an error message.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 3A and 3B illustrate an example of a driver model that may be implemented in the driver system of FIG. 1;

DESCRIPTION OF EMBODIMENTS

Networks of devices may be implemented for a particular function. In some of these networks, the devices may be controlled by a user apparatus. The user apparatus may receive measured conditions from the devices and communicate commands to the devices, which may affect operation of the devices. For example, the networks of devices may be implemented in home automation systems or smart energy systems. In these and other examples, a user apparatus may include a smartphone that runs one or more applications that are configured to receive measured conditions and to communicate commands to the devices.

In the networks of devices, the heterogeneity and diversity of devices may cause difficulties for users, developers, and vendors. For example, standards and protocols written to control the devices or to receive measured conditions from the devices may be limited to a subset of the devices. Accordingly, some embodiments described herein include a capability to establish communication between different devices using different communication standards and protocols. For example, some embodiments provide a platform that integrates a new, unknown, and non-standard device to a network without interfering with a user experience and without recompiling, reinstalling, or restarting an application controlling the devices. Additionally, some embodiments provide a mechanism for vendors and developers to develop device drivers that enable inter-device communication. These and other embodiments enable a developer to write a new driver model according to a driver template. Using pattern matching, the driver model is loaded and used as a device driver. The driver model may be written without knowledge of an application implemented on the device, the source code of the application, or compiling the driver at a user apparatus. Additionally, these and other embodiments dynamically load the device driver during runtime and generate the functionality to use the device driver. These and other embodiments are described with reference to the appended drawings.

Figure 1:
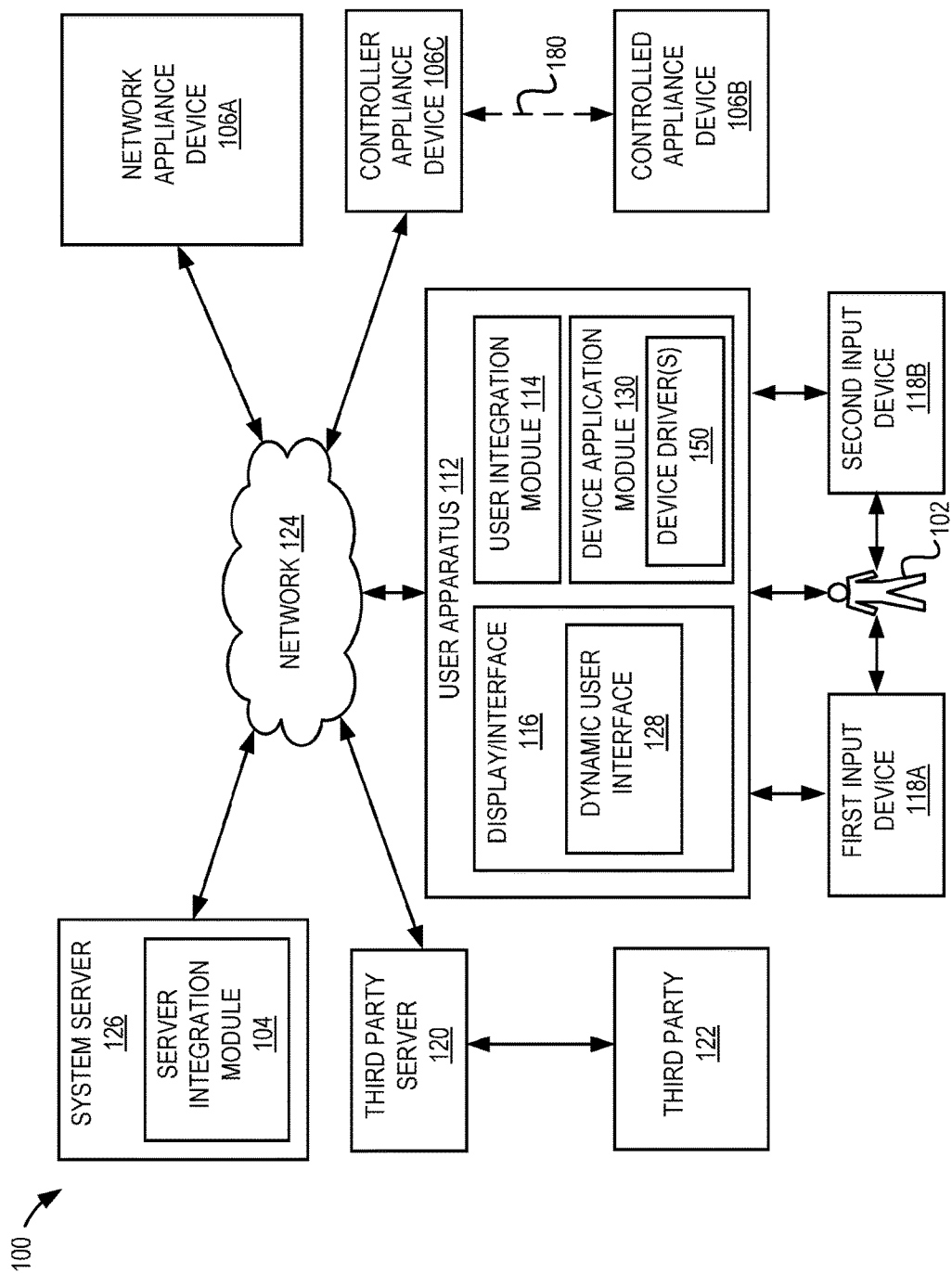
FIG. 1 illustrates an example heterogeneous device system (device system)

FIG. 1 illustrates an example heterogeneous device system (device system) 100. In the device system 100, a system server 126 and/or a user apparatus 112 may integrate device drivers 150 for appliance devices 106A-106C (generally, appliance device 106 or appliance devices 106) and/or input devices 118A and 118B (generally, input device 118 or input devices 118). The appliance devices 106 and the input devices 118 are collectively referred to as the devices 106/118. By integrating the device drivers 150, the user apparatus 112 may receive input via the devices 106/118.

The device drivers 150 may be integrated without interfering with an experience of a user 102. For example, the device drivers 150 may be integrated without recompiling, reinstalling, or restarting the user apparatus 112 or any application running on the user apparatus 112. In the device system 100, the device drivers 150 that may be ultimately integrated into the user apparatus 112 may be developed without a knowledge of an application running on the devices 106/118, source code of the application, and without compiling the device drivers 150.

The device system 100 of FIG. 1 is described generally. Some more specific embodiments of the device system 100 may include a demand response (DR) system and a home automation system. In the DR system, energy usage of one or more of the appliance devices 106 may be curtailed. For example, the appliance devices 106 may include air-conditioners, water heaters, heaters, dish washers, lights, pool heaters, hot tubs, or dryers. The device drivers 150 may enable the user apparatus 112 to control operation of the appliance devices 106 according to a DR program, e.g., responsive to a request to participate in a DR event. Controlling the operation of the appliance devices 106 may reduce energy consumption.

In the home automation system, environmental conditions of a home may be adjusted through operation of the appliance devices 106. In the home automation system, the appliance devices 106 may include a smart thermostat, for instance. The device drivers 150 may enable the user apparatus 112 to control operation and/or monitor conditions of the appliance device 106. For example, the user apparatus 112 may be used to change a temperature setting of the smart thermostat and/or a current temperature of a residence may be displayed on the user apparatus 112.

In the DR system, the home automation system, and in other examples of the device system 100, the user apparatus 112 may not know the application and/or the source code running the devices 106/118. For example, without the knowledge of the application and/or source code, the device drivers 150 may be developed and integrated into the user apparatus 112 and/or the system server 126. Moreover, the user apparatus 112 may operate the appliance devices 106 without knowledge of the application and/or the source code running the appliance devices 106.

As depicted in FIG. 1, the device system 100 may include the system server 126, the user apparatus 112, the appliance devices 106, the input devices 118, and a third party server 120. Additionally, in the device system 100, a third party 122 may be associated with the third party server 120, and the user 102 may be associated with the user apparatus 112.

In the device system 100, the system server 126, the user apparatus 112, the appliance devices 106, and the third party server 120 may communicate via a network 124. The network 124 may include any communication network configured for communication of signals between any of the components (e.g., 106, 112, 118, 120, and 126) of the device system 100.

The network 124 may be wired or wireless. The network 124 may have numerous configurations including a star configuration, a token ring configuration, or another suitable configuration. Furthermore, the network 124 may include a local area network (LAN), a wide area network (WAN) (e.g., the Internet), and/or other interconnected data paths across which multiple devices may communicate. In some embodiments, the network 124 may include a peer-to-peer network. The network 124 may also be coupled to or include portions of a telecommunications network that may enable communication of data in a variety of different communication protocols.

In some embodiments, the network 124 may include one or more types of communication networks for sending and receiving data. For example, the network 124 may include a BLUETOOTH® communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communications network, any similar communication networks, other communication networks, or any combination thereof. The data communicated in the network 124 may include data communicated via short messaging service (SMS), multimedia messaging service (MMS), hypertext transfer protocol (HTTP), direct data connection, wireless application protocol (WAP), e-mail, smart energy profile (SEP), Echonet Lite, OpenADR, or data communicated on any other protocol that may be implemented with the appliance devices 106, the input devices 118, other communication network devices, or any combination thereof.

In the device system 100, the third party server 120 may include a hardware server that includes a processor, memory, and communication capabilities. In the illustrated embodiment, the third party server 120 may be coupled to the network 124 to send and receive information to and from one or more of the user apparatus 112, the system server 126, and the devices 106/118 via the network 124.

The third party server 120 may be associated with the third party 122. Generally, the third party 122 may include any entity such as a vendor or developer that provides (e.g., manufactures and/or sells) one or more of the devices 106/118. Additionally or alternatively, the third party 122 may include an entity that generates and communicates a driver model for one or more of the devices 106/118. The driver model may include a driver software template for the devices 106/118. Based on the driver model, a device drivers 150 may be integrated into the user apparatus 112.

In some embodiments, the third party 122 may include a company that develops and sells one or more of the devices 106/118. In other embodiments, the third party 122 may include an individual that develops and/or sells the template for one or more of the devices 106/118.

The appliance devices 106 may include a computer-based hardware device that includes a processor, memory, and communication capabilities. One or more of the appliance devices 106 may be coupled to the network 124 to communicate data with one or more of the user apparatus 112, the system server 126, the third party server 120, the input devices 118, and the other appliance devices 106.

The device system 100 may include three types of appliance devices 106: a network appliance device 106A, a controlled appliance device 106B, and a controller appliance device 106C. Generally, the network appliance device 106A, the controlled appliance device 106B, and the controller appliance device 106C may be substantially similar. However, the ways in which the appliance device 106 communicate in the device system 100 may differ.

The network appliance device 106A may be configured to receive communication via the network 124. The communication may include commands, responses, measured conditions, and the like. The commands may be configured to alter operation of the network appliance device 106A. The commands may be communicated directly from the user apparatus 112 and/or the system server 126. Additionally, the network appliance device 106A may communicate signals representative of a measured condition to the user apparatus 112 and/or the system server 126. The measured condition may include an environmental condition in which the network appliance device 106A is located and/or a condition of the network appliance device 106A. The condition of the network appliance device 106A may include a setting, a duty cycle, a voltage, an operational status, and the like. The responses may include a measure condition and/or may include write response indicating that a command is received/implemented.

The controller appliance device 106C and the controlled appliance device 106B may include computer-based hardware devices that include a processor, memory, and communication capabilities. The controller appliance device 106C may be configured to receive commands from the user apparatus 112 and/or the system server 126 and communicate a signal representative thereof to the controlled appliance device 106B. The command may control operation of the controlled appliance device 106B. For instance, the controller appliance device 106C may include a thermostat and the controlled appliance device may include a heater. The thermostat may at least partially control operation of the heater.

Additionally, the controller appliance device 106C and/or the controlled appliance device 106B may communicate signals representative of a measured condition to the user apparatus 112 and/or the system server 126. The measured condition may include an environmental condition in which the controller appliance device 106C and/or the controlled appliance device 106B are located and/or a condition of the controller appliance device 106C and/or the controlled appliance device 106B. The condition of the controller appliance device 106C and/or the controlled appliance device 106B may include a setting, a duty cycle, a voltage, an operational status, and the like.

The controller appliance device 106C and/or the controlled appliance device 106B may also respond. The responses may include a measure condition (as discussed above) and/or may include write response indicating that a command is received/implemented.

The communication between the controller appliance device 106C and the controlled device 106B is represented in FIG. 1 by dashed arrow 180. The communication 180 between the controlled appliance device 106B and the controller appliance device 106C may be via a network substantially similar to network 124, an electrical connection, a mechanical coupling, or some combination thereof.

Some examples of the appliance devices 106 include a lightbulb, a lighting system, a door lock, a water heater, a sprinkler system, an air-conditioner, a thermostat, an alarm clock, a window shade, a switch, a smoke alarm, a camera, an egg minder, an electrical outlet, a personal (e.g., piggy) bank, a propane tank, an alarm, a personal proximity sensor, a door sensor, a biometric sensor, a mattress, a mobile device, an automotive sensor, a clock, a cooking device, an electrical breaker, a personal alert sensor, a motion sensor, a calendar, a television, a radio, a radio frequency identification (RFID) tag/RFID detector, and a thermometer. Some additional examples of the controller appliance device 106C may include a remote electrical outlet, light dimmers, breaker actuators, and the like.

The input devices 118 may include any input device capable of providing an input interface between the user 102 and the user apparatus 112. Examples include, but are not limited to, a touchscreen, a touchpad, a mouse, a keyboard, a microphone, a wearable sensor, and the like. Alternately or additionally, the input devices 118 may include computer-based hardware devices that include a processor, memory, and communication capabilities and that are capable of providing an input interface between the user 102 and the user apparatus 112.

The input devices 118 may include devices that receive input from the user 102 or measure input from the user 102. The input communicated from the input devices 118 may be multimodal. Accordingly, the user apparatus 112 may be configured to receive multiple types or modes of user input. The multiple types or modes of user input may be received and/or processed with some overlap in duration.

For example, the first input device 118A may include a microphone configured to receive voice commands of the user 102. Thus, the user 102 may provide audio commands to the first input device 118A. Additionally, the second input device 118 may include a wearable sensor such as an accelerometer. A pattern that is measured by the accelerometer may be communicated as a command to the user apparatus 112. Some additional examples of the input devices 118 may include other computing devices such as wearable, optical head-mounted displays, smartphones, personal computers, tablet computers, and the like.

Although the input devices 118 are depicted separate from the user apparatus 112, one or more of the input devices 118 may be included in the user apparatus 112. For example, the first input device 118A may include a microphone of the user apparatus 112.

The user 102 may include any individual or entity interacting in the device system 100. The user 102 may provide an input to the input devices 118 and/or to a display/interface 116 of the user apparatus 112. In some embodiments, the user 102 may include a company or an administrator that may be in charge of a site or residence in which the appliance devices 106 may be implemented.

The user 102 may be associated with the user apparatus 112. For example, the user 102 may own or regularly operate the user apparatus 112 such that data communicated from the user apparatus 112 may be attributed to the user 102 and the data communicated to the user apparatus 112 may be intended for the user 102.

The user apparatus 112 may include a computing device that includes a processor, memory, and network communication capabilities. In the device system 100, the user apparatus 112 may be coupled to the network 124 for communication with one or more of the system server 126, the appliance devices 106, and the third party server 120. Some examples of the user apparatus 112 may include a laptop computer, a desktop computer, a tablet computer, a mobile telephone, a personal digital assistant (PDA), a mobile e-mail device, a portable game player, a portable music player, a television with one or more processors embedded therein or coupled thereto, or other electronic device capable of accessing and communicating via the network 124.

The user apparatus 112 may include the display/interface 116. The display/interface 116 may display information and data to the user 102. For instance, the appliance devices 106, the input devices 118, the system server 126, or any combination thereof may communicate information to the user apparatus 112, which may be displayed on the display/interface 116. An example of the data displayed to the user apparatus 112 may include a signal representative of a condition measured by one of the appliance devices 106. The signal may be communicated to the user apparatus 112 and displayed by the display/interface 116. Another example of the data and information displayed on the display/interface 116 may include error messages communicated from the system server 126.

The display/interface 116 may receive input from the user 102. In the embodiment depicted in FIG. 1, the user 102 may provide input to the user apparatus 112 via the input devices 118 and/or via the display/interface 116. For example, the user 102 may select (e.g., touch or press or otherwise select) a user interface (UI) element such as an icon displayed on the display/interface 116, which may be interpreted as a defined input. An example of the display/interface 116 that receives input from the user 102 may include a touchscreen or another electronic visual display.

Additionally or alternatively, user input may be communicated via the input devices 118. For example, the input devices 118 may be configured to measure a condition of the user 102 or to receive input from the user 102. A representation of the input may be communicated to the user apparatus 112. In some embodiments, the display/interface 116 may reflect the input received by the input device 118. For example, a UI element may be varied to reflect a user input or representation thereof communicated to the user apparatus 112 by one of the input devices 118. Some embodiments may omit the input devices 118 or the display/interface 116 may not be configured to receive input via the display/interface 116. Thus, in these other embodiments, the user 102 may provide input to the user apparatus 112 via one of the display/interface 116 or the input devices 118.

In some embodiments, the display/interface 116 may combine a display functionality and an input reception functionality in a dynamic user interface 128. The dynamic user interface 128 may be configured to display information and data related to one or more of the appliance devices 106 and/or enable input of a command related to the one or more of the appliance devices 106. The dynamic user interface 128 may adopt or drop UI elements based on device drivers 150 integrated into the user apparatus 112. For example, the user apparatus 112 may load a device driver 150 for the controlled appliance device 106B. Accordingly, the dynamic user interface 128 may include a UI element that enables the user 102 to control the controlled appliance device 106B. Additionally or alternatively, the dynamic user interface 128 may display a current setting of the controlled appliance device 106B (e.g., a temperature setting and/or a locally measured temperature).

The user apparatus 112 may include a user integration module 114. The user integration module 114 may include code and routines for integration of one or more device drivers 150. In FIG. 1, the user integration module 114 is included in the user apparatus 112. In some embodiments, the user integration module 114, some portion thereof, or some functionality attributed thereto may be stored on and/or performed by a server integration module 104 included in the system server 126. In some embodiments, the user integration module 114 may be implemented using hardware including a field-programmable gate array (FPGA) or an application-specific integrated circuit (ASIC). In some other instances, the user integration module 114 may be implemented using a combination of hardware and software.

The user integration module 114 may be configured to integrate device drivers 150 of the devices 106/118 into a device application module 130 of the user apparatus 112. For example, integration of the device drivers 150 may enable control of the appliance devices 106 through input received at the user apparatus 112, monitoring of conditions measured by the appliance devices 106 at the user apparatus 112 (e.g., display of data representative of such conditions), reception of input from the input devices 118, or some combination thereof. The integration of the device drivers 150 may be performed with no or with minimal or reduced interruption of operation of the user apparatus 112 and the operation of the device application module 130.

In some embodiments, the user integration module 114 may be configured to receive a verified file. The verified file may be received from the system server 126 in some embodiments. The verified file may be representative of a driver model generated by the third party 122. The driver model may include a list of variables associated with the devices 106/118 to which it pertains. The driver model may also include one or more characteristics of the variables, one or more get subroutines, one or more set subroutines, one or more placeholder variables, or some combination thereof.

The user integration module 114 may be configured to load some portion of the verified file. When the verified file or some portion thereof is loaded, it may be used by the device application module 130. For example, the device application module 130 may use the verified file to access or retrieve information and data from the appliance devices 106. Additionally or alternatively, the device application module 130 may use the verified file to write information and data to the appliance devices 106. Additionally still, after the verified file is loaded to the user apparatus 112, the device application module 130 may receive input via one or more of the input devices 118.

The device application module 130 may include an application that performs one or more specific functions using the devices 106/118. For example, the device application module 130 may include an application that includes a DR application module, a heating ventilation and air-conditioning (HVAC) application module, and a home automation application module.

In embodiments in which the device application module 130 includes multiple application modules, device drivers 150 of one or more of the devices 106/118 may be integrated into two or more application modules. For example, the device application module 130 may include a DR application module and an HVAC application module. Each of the DR application module and the HVAC application module may include a device driver 150 for one of the appliance devices 106, such as an air-conditioning unit. The air-conditioning unit may communicate with the device application module 130, which may include communication of information and commands with both of the DR application module and the HVAC application module.

The device application module 130 may include code and routines for use with the appliance devices 106. In some embodiments, the device application module 130 may be implemented using hardware including a field-programmable gate array (FPGA) or an application-specific integrated circuit (ASIC). In some other instances, the device application module 130 may be implemented using a combination of hardware and software.

In some embodiments, use of the verified file may be based on pattern matching. Generally, pattern matching may include comparing a computer code that includes some data of interest with an expected format of the computer code. Based on a relationship between the expected format and the computer code, particular values may be input to the computer code and/or values may be extracted from the computer code.

Additionally, the user integration module 114 may generate one or more user interface (UI) elements. The UI element may be generated based on the verified file. For example, the UI element may include an UI element embodying one or more of the variables. The UI element may also be associated with a particular functionality of the device application module 130. Accordingly, manipulation of the UI element may result in a corresponding operation of the appliance device 106 and/or a change of a condition at the appliance device 106 may result in a corresponding change in the UI element.

The system server 126 may include a hardware server that includes a processor, memory, and communication capabilities. In the illustrated embodiment, the system server 126 may be coupled to the network 124 for communication with one or more of the user apparatus 112, the third party server 120, and the appliance devices 106.

The system server 126 may include the server integration module 104. The server integration module 104 may include code and routines for integrating device drivers 150 into one or more systems of the user apparatus 112. In FIG. 1, the server integration module 104 is included in the system server 126. In some embodiments, the server integration module 104 may act in part as a thin-client application that may be stored on or make up a part of the user apparatus 112 (e.g., the user integration module 114) and in part as components that may be stored on the system server 126. In some embodiments, the server integration module 104 may include a web service, a cloud application, a locally stored application, and the like. In some embodiments, the server integration module 104 may be implemented using hardware including a field-programmable gate array (FPGA) or an application-specific integrated circuit (ASIC). In some other instances, the server integration module 104 may be implemented using a combination of hardware and software.

The server integration module 104 may be configured to receive a driver model. The driver model may be configured for the devices 106/118. The driver model may be received from the third party 122. The server integration module 104 may determine whether the driver model is format-compliant and validate syntax of the driver model.

For example, in some embodiments, the driver model may be formatted in extensible markup language (XML). In these and other embodiments, a determination as to whether the driver model is format-compliant may include a determination of whether the driver model is well-formed. At least in the context of XML, a well-formed template may adhere to syntax rules as specified by a standard (e.g., XML 1.0). A determination that the driver model is well-formed may indicate that the driver model satisfies physical structures and logical structures of the standard.

The server integration module 104 may also generate a verified file that is representative of the driver model. The verified file may be formatted to dynamically load on the device application module 130 using the user integration module 114 and to dynamically support the devices 106/118 using the dynamic user interface 128. The server integration module 104 may then communicate the verified file to the user apparatus 112.

Modifications, additions, or omissions may be made to the device system 100 without departing from the scope of the present disclosure. For example, while FIG. 1 depicts one user apparatus 112 associated with one user 102, three appliance devices 106, two input devices 118, one third party server 120, and one system server 126, the present disclosure applies to a device system architecture having one or more user apparatuses 112 associated with one or more users 102, one or more appliance devices 106, one or more third party servers 120, one or more input devices 118, one or more system servers 126, or any combination thereof. Moreover, the separation of various components and servers in the embodiments described herein is not meant to indicate that the separation occurs in all embodiments. Moreover, it may be understood with the benefit of this disclosure that the described components and servers may generally be integrated together in a single component or server or separated into multiple components or servers.

In the device system 100, memory may include a non-transitory memory that stores data for providing the functionality described herein. The memory may be included in storage that may be a dynamic random access memory (DRAM) device, a static random access memory (SRAM) device, flash memory, or some other memory device. In some embodiments, the storage also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 2:
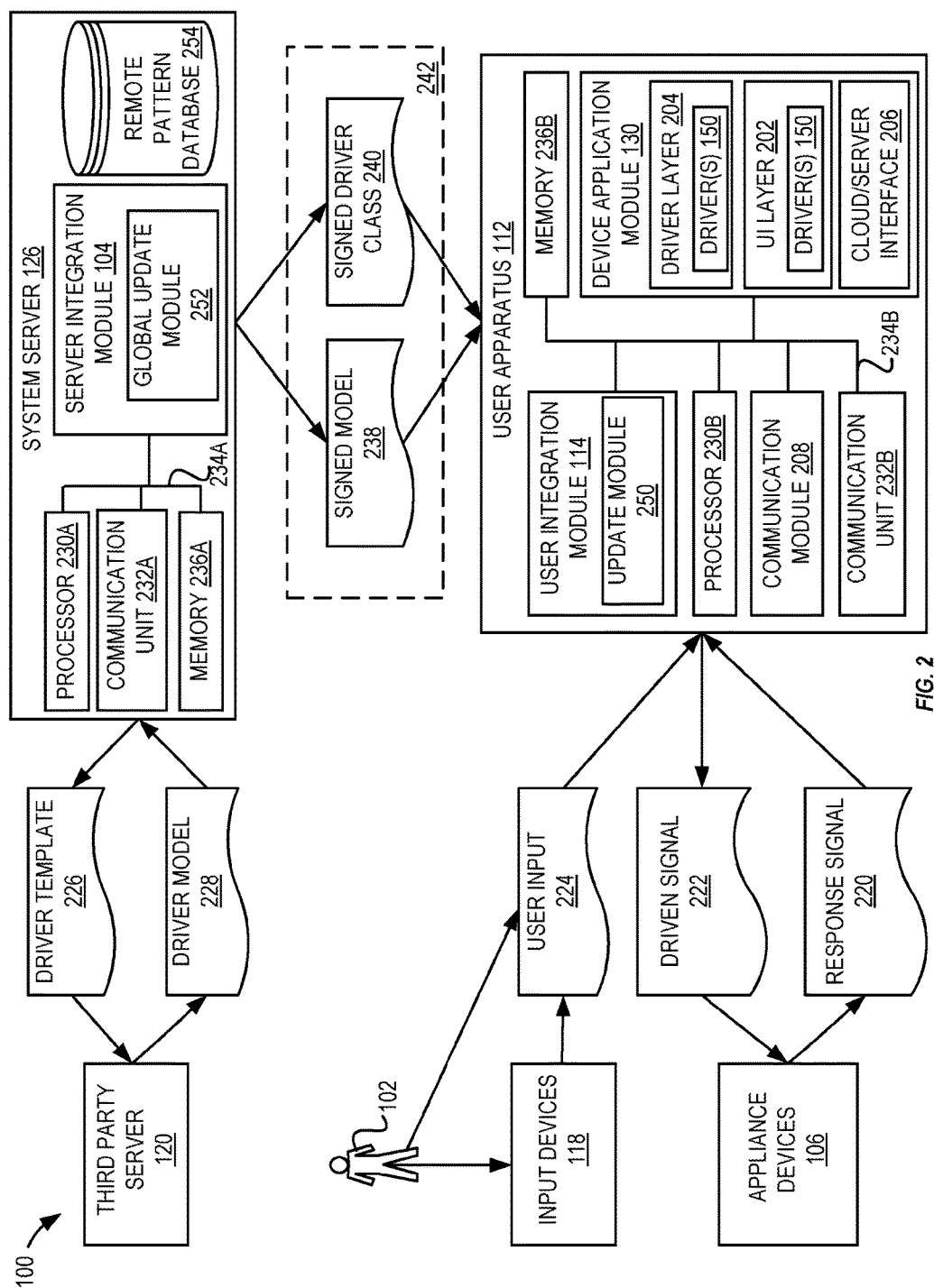
FIG. 2 is a block diagram of the device system that includes detailed views of an example system server and an example user apparatus.

FIG. 2 is a block diagram of an example of the device system 100 that includes detailed views of an example of the system server 126 and an example of the user apparatus 112. The system server 126 may include a processor 230A, a communication unit 232A, a memory 236A and the server integration module 104. The processor 230A, the communication unit 232A, the memory 236A, and the server integration module 104 may be communicatively coupled by a bus 234A.

The user apparatus 112 may include the device application module 130, a processor 230B, a memory 236B, a communication unit 232B, the user integration module 114, and a communication module 208. The device application module 130, the processor 230B, the memory 236B, the communication unit 232B, the user integration module 114, and the communication module 208 may be communicatively coupled by a bus 234B. The processors 230A and 230B may be generally referred to as the processor 230 or the processors 230. The memories 236A and 236B may be generally referred to as the memory 236. The communication units 232A and 232B may be generally referred to as the communication unit 232 or the communication units 232. The buses 234A and 234B may be generally referred to the bus 234 or the buses 234.

The processors 230 may include an arithmetic logic unit (ALU), a microprocessor, a general-purpose controller, or some other processor array configured to perform computations. The processors 230 may be coupled to the buses 234 for communication with the other components. The processors 230 may generally process data signals and may include various computing architectures including a complex instruction set computer (CISC) architecture, a reduced instruction set computer (RISC) architecture, or an architecture implementing a combination of instruction sets. Although the system server 126 and the user apparatus 112 of FIG. 2 include a single processor 230, multiple processors may be included in the system server 126 and/or the user apparatus 112. Other processors and physical configurations may be possible.

The memory 236 may be configured to store instructions and/or data that may be executed by the processors 230. The memory 236 may be coupled to the buses 234 for communication with the other components. The instructions and/or data may include code for performing the techniques or methods described herein. The memory 236 may be a DRAM device, an SRAM device, flash memory, or some other memory device. In some embodiments, the memory 236 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication units 232 may be configured to transmit and receive data to and from the user apparatus 112, the system server 126, the third party server 120, and the devices 106/118. The communication units 232 may be coupled to the bus 234. In some embodiments, the communication units 232 include a port for direct physical connection to the network 124 of FIG. 1 or to another communication channel. For example, the communication units 232 may include a USB, SD, CAT-5, or similar port for wired communication with the components of the device system 100. In some embodiments, the communication units 232 include a wireless transceiver for exchanging data via communication channels using one or more wireless communication methods, including IEEE 802.11, IEEE 802.16, BLUETOOTH®, global system for mobile (GSM), general packet radio service (GPRS), enhanced data rates for GSM evolution (EDGE), code division multiple access (CDMA), universal mobile telecommunications system (UMTS), long-term evolution (LTE), LTE-advanced (LTE-A), MQTT, MQTT-S, CoAP, REST API, XMPP, or another suitable wireless communication method.

In some embodiments, the communication units 232 include a cellular communications transceiver for sending and receiving data over a cellular communications network including via SMS, MMS, HTTP, direct data connection, WAP, e-mail, or another suitable type of electronic communication. In some embodiments, the communication units 232 include a wired port and a wireless transceiver. The communication units 232 may also provide other conventional connections to the network 124 of FIG. 1 for distribution of files and/or media objects using standard network protocols including TCP/IP, HTTP, HTTPS, and SMTP, etc.

In the embodiment of FIG. 2, the third party server 120 may be configured to exchange data with the system server 126, which data may include one or both of a driver template 226 and a driver model 228. In some embodiments, the system server 126 may send or otherwise make available the driver template 226 to the third party server 120. The driver template 226 may include a pseudo code or a source code for a device driver 150. The driver template 226 may be generic such that the device drivers 150 may be developed based on the driver template 226 for multiple appliance devices 106 and/or multiple input devices 118. The driver template 226 may include an XML file, a comma-separated values (CSV) file, a JAVA file or another suitable well-defined structure. For example, the driver template 226 may include the XML schema definition (XSD) schema and/or an XML file with one or more variables omitted.

A third party (e.g., the third party 122 of FIG. 1) may receive the driver template 226 and generate the driver model 228 therefrom. In some embodiments, the driver model 228 may include the driver template 226 that has been completed by a third party such as a developer or a vendor.

The driver model 228 may be specific to one of the devices 106/118. Accordingly, the driver model 228, once loaded on the user apparatus 112, may enable interaction with the devices 106/118. For instance, the driver model 228 may include a list of variables associated with the devices 106/118, one or more variable characteristics of one or more of the variables, one or more get subroutines that are configured to read values from the device 106/118, a read device address, one or more placeholder variables, or some combination thereof.

The third party server 120 may communicate or otherwise make available (e.g., load onto a website) the driver model 228 to the system server 126. In particular, the driver model 228 may be communicated to the server integration module 104 in some embodiments. The server integration module 104 may perform one or more operations to verify the structure and content of the driver model 228. For example, the server integration module 104 may determine whether the driver model 228 is format-compliant, may validate the syntax of the driver model 228 using the driver template 226 (e.g., using XSD schema), may confirm an absence of malicious code in the driver model 228, or some combination thereof.

In response to the server integration module 104 verifying the content and structure of the driver model 228, the server integration module 104 may generate a verified file 242. The verified file 242 may be representative of the driver model 228. The verified file 242 may be formatted to dynamically load on the user apparatus 112 (in particular to be integrated into a driver layer 204 of the device application module 130) and to dynamically support the devices 106/118.

In some embodiments, generating the verified file 242 may include creating a driver class. The driver class may include at least a portion of the driver model 228. In embodiments in which the device includes the appliance device 106, the driver class may be configured to parse a response signal 220 communicated by the appliance device 106. For instance, a result of execution of one of the get subroutines by the user apparatus 112 may include generation and output of a driven signal 222 that includes a data request. In response to the driven signal 222, the appliance devices 106 may communicate a response signal 220. The driver class may parse the response signal 220 for values requested in the get subroutine. Additionally, the driver class may be configured to generate and send a driven signal including a command to the appliance device 106 using one or more set subroutines.

The server integration module 104 may then synthesize an executable library including the driver class. The system server 126 may add an integrity check value such as a digital signature or a message authentication code (MAC) to the executable library. As used herein, the executable library including the integrity check value is referred to as being signed. Additionally, the executable library including the driver class and signed by the system server 126 may be referred to as a signed driver class 240. Accordingly, in some embodiments, the verified file 242 may include the signed driver class 240, which may be communicated to the user apparatus 112.

Additionally or alternatively, in some embodiments, the verified file 242 may include the driver model 228, which may be signed (e.g., adding an integrity check value thereto) by the server integration module 104 to generate a signed model 238. Accordingly, in these and other embodiments, the verified file 242 may include the signed model 238. The signed model 238 may be communicated to the user apparatus 112.

In some embodiments, the user apparatus 112 may include the communication module 208. The communication module 208 may be configured to handle communication between the user integration module 114, the device application module 130, and other components of the user apparatus 112 (e.g., 230B, 232B, and 236B). In addition, the communication module 208 may be configured to send and receive data, via the communication unit 232B, to and from one or more of the appliance devices 106, the input devices 118, the third party server 120, the system server 126, or some combination thereof. In some instances, the communication module 208 may cooperate with the other modules (e.g., 114 and 130) to receive and/or forward, via the communication unit 232B, data to and from the components of the device system 100 of FIG. 1. In some embodiments, the communication module 208 may be configured to receive or access the verified file 242 from the system server 126. The communication module 208 may communicate the verified file 242 to the user integration module 114.

The user integration module 114 may receive the verified file 242 and dynamically load the verified file 242 into the device application module 130. Specifically, in some embodiments, the user integration module 114 may dynamically load the verified file 242 into the driver layer 204 of the device application module 130 and/or into a user interface layer 202 (in FIG. 2, "UI layer 202"). When the verified file 242 is loaded into the driver layer 204 or the user interface layer 202, the device application module 130 incorporates the verified file 242 and functions allowed by the verified file 242.

The driver layer 204 may be configured to execute one or more device drivers 150. For example, the driver layer 204 may be configured to execute one or more get and/or set subroutines. The user interface layer 202 may be configured to receive user input 224 from the user 102 and/or the input devices 118. The user interface layer 202 may then communicate the user input 224 to the driver layer 204. In response to the user input 224, the driver layer 204 may execute the device drivers 150.

For example, after the verified file 242 is loaded, the device application module 130 may control operation of the appliance devices 106. Additionally, after the verified file 242 is loaded, the device application module 130 may receive the response signal 220, which may indicate a condition of the appliance devices 106 and/or may indicate whether a set subroutine is received and implemented. Additionally, after the verified file 242 is loaded, the device application module 130 may receive the user input 224 from the input devices 118.

The user integration module 114 may load the verified file 242 dynamically. For example, while the device application module 130 is operating, the verified file 242 may be loaded into the driver layer 204 and/or the user interface layer 202. Accordingly, operation of the device application module 130 may not be interrupted during the loading of the verified file 242.

In embodiments in which the verified file 242 includes the signed model 238, the user integration module 114 may load the signed model 238 into a generic driver class. The generic driver class may then integrate the signed model 238 as a device driver 150. The generic driver class may also incorporate other device drivers 150. The other device drivers 150 may be configured for operation of other devices 106/118. The device application module 130 may dynamically parse the signed model 238 each time the device driver 150 is used. In embodiments in which the verified file 242 includes the signed driver class 240, the user integration module 114 may dynamically load the signed driver class 240 to the device application module 130. The device application module 130 may then make a dynamic call to the methods and variables provided by the signed driver class 240.

Loading the verified file 242 onto the user integration module 114 may generate a UI element based on the verified file 242. Some examples of the UI element may include a UI element configured to receive user input and/or display information and data. The UI element may be incorporated in a dynamic user interface such as the dynamic user interface 128 of FIG. 1. The user input 224 may then be input through the user interface layer 202. In some embodiments, the dynamic user interface may include a hierarchy of user interface (UI) pages.

In some embodiments, a device driver 150 loaded to the user interface layer 202 may be dynamically updated. Updating the device driver 150 may enable the user input 224 to better reflect an intent of the user 102. In some embodiments, dynamically updating the device driver 150 may enable personalization to the user 102. For example, the device driver 150 may be dynamically updated to compensate for individual characteristics such as accent, voice intonations, and the like. Some of the input devices 118 receive input that may include some user-dependent variation. The user input 224 may accordingly benefit from periodic updates to better accommodate user-dependent variation.

For example, one of the input devices 118 may include a microphone. The voice of the user 102 may vary and voices between users may vary. Accordingly, a device driver 150 that receives the user input 224 from the microphone may be dynamically updated to better reflect the intent of the user 102.

In these and other embodiments, the device application module 130 may include a cloud/server interface 206, the user integration module 114 may include an update module 250, and the server integration module 104 may include a global update module 252. Additionally, in these and other embodiments, a device driver 150 may include a globally defined version, referred to as a global device model and a locally defined version, referred to as a local device model.

The global device model may be stored in a remote pattern database 254, which may be included in the system server 126. The global device model may be used concurrently by other users in other systems similar to the system 100 and may be an initial local device model for a new user. The global device model may be received by the update module 250 of the user apparatus 112. The update module 250 may adopt the global device model as a local device model, which may be loaded on the driver layer 204.

After the global device model is adopted as the local device model, the user input 224 may be received at the user apparatus 112. The user input 224 may be received from one of the input devices 118 that are associated with a device driver 150 that is dynamically updated. The update module 250 may then process the user input 224. Based on the processed user input and the adopted local device model, the update module 250 may detect a command. Additionally, the update module 250 may determine whether an error in the user input 224 is less than a threshold error value.

In response to the error being greater than the threshold error value, the update module 250 may communicate an error message. In response to the error being less than the threshold error value, the update module 250 may update the local device model to reflect the user input 224 and to minimize an error rate. The error rate may be indicative of the error of the user input 224 being high enough for the update module 250 to be unable to discern the command. The update module 250 may then send the user input 224 to the device application module 130 for communication to the appliance device 106. The update module 250 may determine whether the updated local device model is reflected in the global device model. In response to the updated local device model being reflected in the global device model, the update module 250 may use the updated local device model as the local device model. In response to the updated local device model not being reflected in the global device model, the update module 250 may communicate the updated local device model to the global update module 252. The global update module 252 may receive the updated local device model from the user apparatus 112. The global update module 252 may update the global device model to minimize an error rate of the multimodal input received at the input device 118 based at least partially on the updated local device model. The global update module 252 may then dynamically download an updated global device model to the user apparatus 112 to replace the updated local device model.

As mentioned above, the global device model may be concurrently updated in a similar manner by other users in other systems. Accordingly, the global device model may reflect input from multiple users and share such input among systems using the global device model.

FIGS. 3A and 3B illustrate an example of a driver model 300 that may be implemented in the device system 100 of FIG. 1. With reference to FIG. 3A, a first portion of the driver model 300 may include a driver type 302. For example, the driver type 302 in the driver model 300 is "HVAC." The driver model 300 may also include a driver name 304 and a driver version 306. The driver name 304 may indicate a vendor or brand. For example, in the driver model 300, the driver name 304 is "Vendor X's HVAC system." The driver version 306 may include a version of an application running on a particular device. For example, in the driver model 300, the driver version 306 is "1.0." Additionally, the driver model 300 may include a list 308 of variables 310A-310F. The list 308 may also include one or more characteristics 312A-312J of the variables 310A-310F. For example, a first variable 310A includes a thermostat having "thermostat name." The first variable 310A includes a first characteristic 312A associated with it. The first characteristic 312A specifies that the first variable 310A is a string type variable indicated by a characteristic "string." Some additional characteristics not included in this example may include access control, permission, type, name, format, structure, and the like.

FIG. 3B includes a second part of the driver model 300. The driver model 300 may include a set subroutine 314. The set subroutine may be configured to write a value to the devices 106/118 of FIGS. 1 and 2. Writing values to the device may control operation of the device. The driver model 300 may also include a get subroutine 316. The get subroutine 316 may be configured to query the device for a value. The get subroutine 316 may further communicate the value to a user apparatus. In some embodiments, multiple get subroutines and/or multiple set subroutines may be included in the driver model 330. In these and other embodiments, each of the get subroutines may be configured to query a value from the device and/or each of the set subroutines may be configured to write a value to the device.

The get subroutine 316 and the set subroutine 314 may include one or more placeholder variables 318A-318F (generally, placeholder variable 318 or placeholder variables 318). The placeholder variables 318 may be replaced with the values when the get subroutine 316 and/or the set subroutine 314 are executed. Some details of executing the set subroutine 314 and the get subroutine 316 are provided elsewhere herein.

Portions of the driver model 300 in FIGS. 3A and 3B are underlined. In some embodiments, the portions of the driver model 300 that are not underlined may be included in a driver template. Additionally, in these and other embodiments, the underlined portions represent the portions of the driver model 300 that a third party such as the vendor, may add to the driver template.

In some embodiments, the third party may additionally add and/or define the variables 310 to the driver model 300. For example, the third party may add the fourth template 310D. In doing so, the third party may add some portion of the driver model 300 related to the fourth template 310D such as <variable> . . . </variable>.

Figure 4:
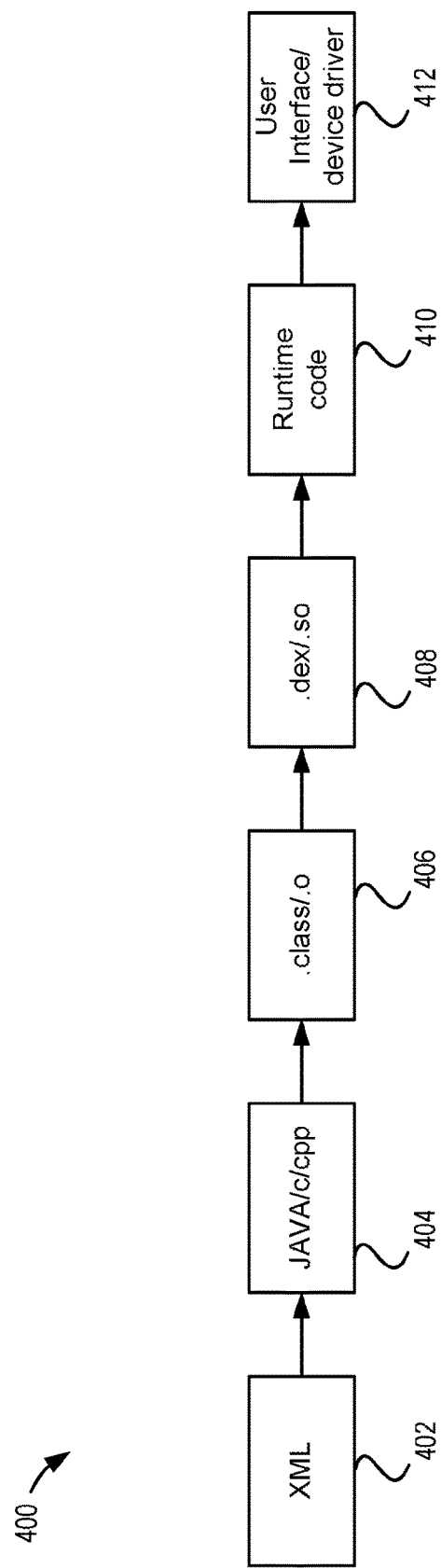
FIG. 4 illustrates an example series of steps that may be included in an integration of a driver model such as the driver model of FIGS. 3A and 3B.

FIG. 4 illustrates an example series of steps 400 that may be included in an integration of a driver model such as the driver model of FIGS. 3A and 3B into a device application module such as the device application module 130 of FIGS. 1-2. With combined reference to FIGS. 2 and 4, the driver model 228 may be formatted in XML, which is represented in FIG. 4 by block 402. The server integration module 104 may create a JAVA driver class based on an XML-formatted driver model 402. The JAVA class is represented in FIG. 4 by block 404. The driver class may alternately or additionally be formatted in C++ or C in some embodiments, or in some other suitable programming language. The creation of a JAVA class 404 from the XML-formatted driver model 402 may be an example of a dynamic library synthesis.

The JAVA class 404 may be compiled into an executable library. The executable library may be formatted in class selector (.class) or as object files (.o), for instance. The executable library is represented in FIG. 4 by item 406. An executable library 406 may be prepared for a specific platform. In a process of preparing the executable library 406 for a specific platform, the executable library may be formatted in Dalvik Executable Format (.dex), dynamic-link library (.dll), or shared library (.so), for instance. The executable library prepared for the specific platform is represented in FIG. 4 by item 408 (prepared library 408).

The prepared library 408 may be dynamically loaded using a class loader. When the prepared library 408 is loaded using the class loader, runtime code 410 may be synthesized into a user interface and absorbed as a driver into a device driver of the device application module 130, which is represented in FIG. 4 by item 412.

Figure 5:
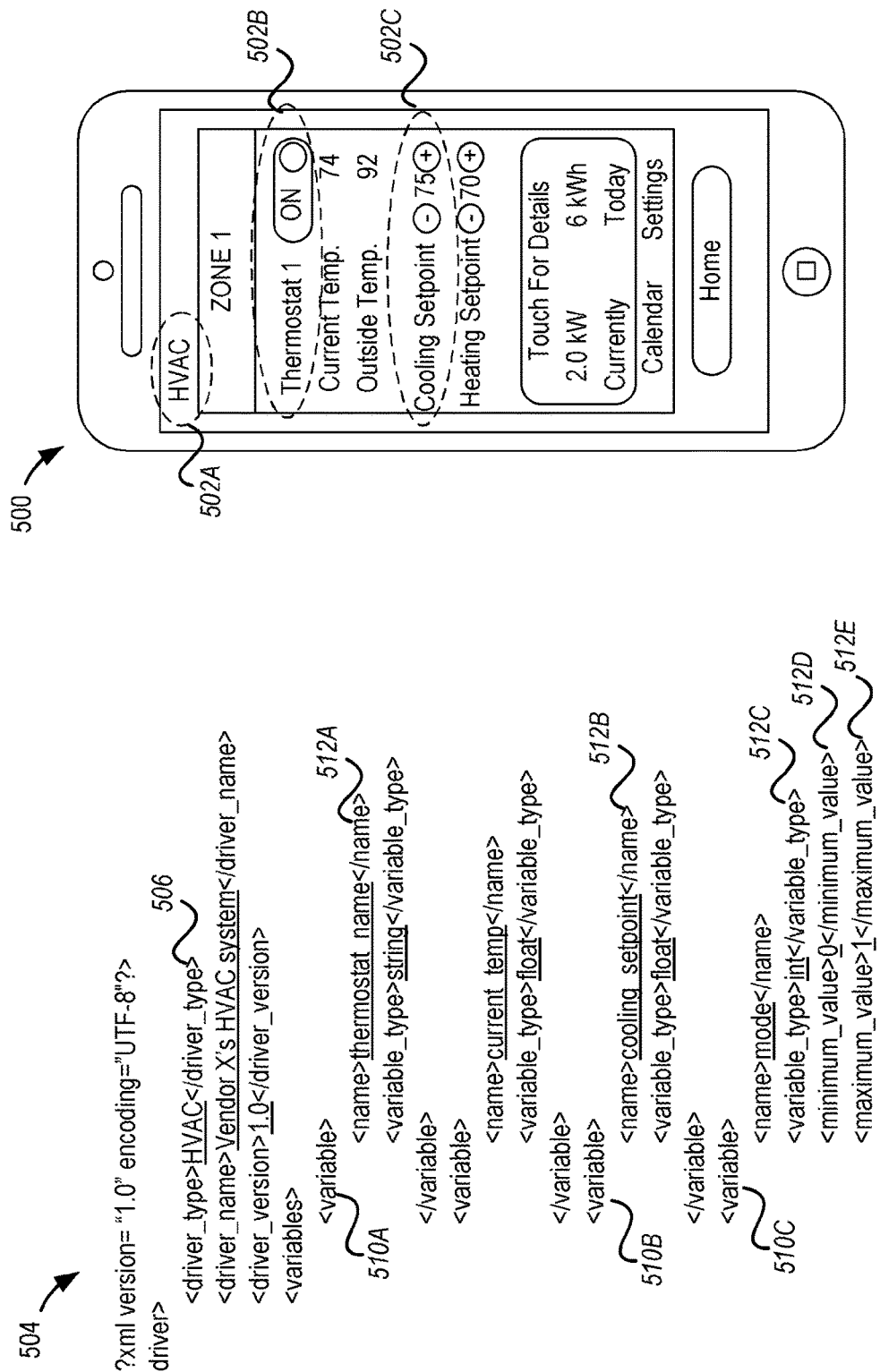
FIG. 5 illustrates an example user interface (UI) page including multiple UI elements that may be based on a portion of a driver model such as the driver model of FIGS. 3A and 3B.

FIG. 5 illustrates an example UI page 500 including multiple UI elements 502A-502C (UI element 502 or UI elements 502) that may be based on a portion of a driver model 504. The driver model 504 is similar to a portion of the driver model 300 of FIG. 3A. Generally, the UI elements 502 may be automatically generated based on the driver model 504 and/or a verified file (e.g., the verified file 242 of FIG. 2). The characteristics of the UI elements 502 may also be based on characteristics 512A-512E in the driver model 504 and/or the verified file.

In some embodiments, some UI elements 502 may be included by default in each UI page 500 of a particular type. For example, all UI pages 500 related to HVAC may include a temperature UI element. In these and other embodiments, the default UI elements may be supplemented or modified based on the driver model 504 and/or the verified file.

In the driver model 504 of FIG. 5, a driver type 506 may indicate that the driver model 504 may be for an HVAC system. Accordingly, one or more of the UI elements 502 may be default UI elements. For example, a first UI element 502A may include a default HVAC UI element.

Additionally, one or more of variables 510A-510C and/or characteristics 512A-512E of the variables 510A-510C may form the basis for one of the UI elements 502B and 502C. For instance, a third variable 510C may form the basis of a mode UI element 502B. The mode UI element 502B may include an on/off UI element, which may determine a mode of an appliance device driven by the driver model 504 or device driver based thereon. One or more characteristics of the mode UI element 502B may be based on the characteristics 512C-512E. Likewise, a second variable 510B may form a basis of a cooling setpoint UI element 502C. The cooling setpoint UI element 502C may allow a user to input a number that corresponds to temperature at which a thermostat is set. Characteristics of the cooling setpoint UI element 502C may be based on a second characteristic 512B.

Figure 6:
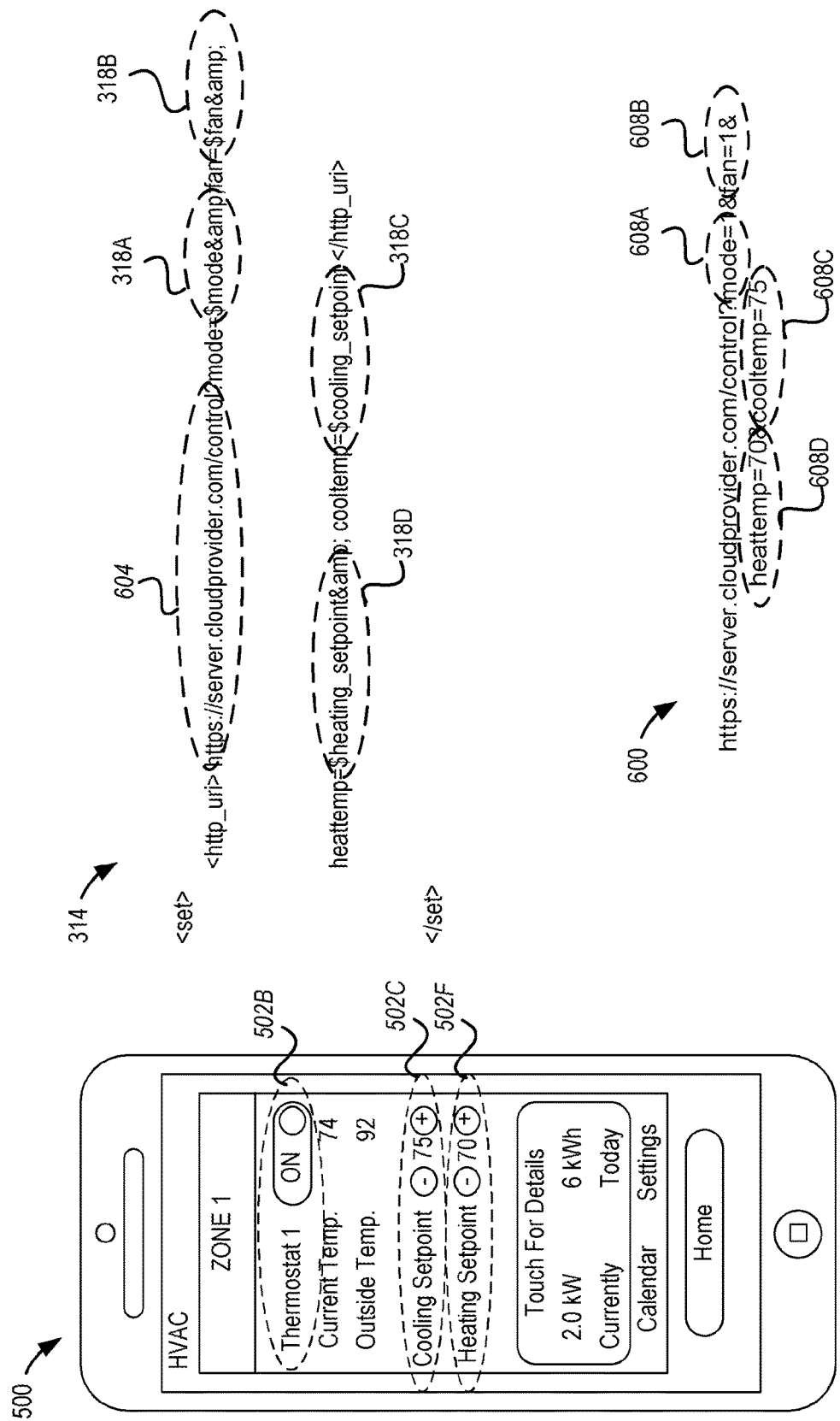
FIG. 6 illustrates an example of setting (e.g., writing) a value at an appliance device based on a portion of a driver model such as the driver model of FIGS. 3A and 3B.

FIG. 6 illustrates an example of setting (e.g., writing) a value at an appliance device based on a portion of the driver model or a verified file that is integrated into a device application module such as the device application module 130. In some embodiments, to set a value on an appliance device, a post message may be sent to an address field included in a set subroutine. The address field may be entered into a driver template by a third party. Placeholder variables may be replaced by a value that is input in a UI page. The placeholder variables may be indicated by a particular character or string of characters.

In some embodiments, a write response may be received from the device indicating reception of the set subroutine. In FIG. 2, the write response may be an example of the response signal 220. It may be determined whether the write response includes an error code. In response to the write response including the error code a write failure message may be communicated. In response to the write response not including the error code, a write complete message may be communicated.

In FIG. 6, the UI page 500 of FIG. 5 is depicted along with a portion of the set subroutine 314 of FIG. 3B. Additionally, a post message 600 is depicted in FIG. 6. The post message 600 may include an HTTP request. The set subroutine 314 may be written in XML. In some embodiments, other software languages and communication protocols are implemented.

The example in FIG. 6 depicts setting an operational condition of an example HVAC system. Analogous processes may be implemented in other types of systems. The post message 600 includes the HTTP request sent to a URI field 604 of the set subroutine 314. Additionally, the post message 600 may include values input from the UI page 500 replacing the placeholder variables 318A-318D of the set subroutine 314. The placeholder variables 318A-318D may be indicated by a "$."

For example, a first placeholder variable 318A includes a mode, which may correspond to a mode UI element 502B. The mode UI element 502B is "on," which may correspond to a replacement of "$mode" with "1" at 608A in the post message 600. Additionally, the "on" may correspond to a replacement of "$fan" with "1" at 608B. Likewise, the other placeholder variables 318C and 318D may be replaced by values from the UI page 500. Specifically, a cooling setpoint UI element 502C may correspond to a third placeholder variable 318C, and a heating setpoint UI element 502F may correspond to a fourth placeholder variable 318D. The values input into the cooling setpoint UI element 502C and the heating setpoint UI element 502F may replace the third placeholder variable 318C and the fourth placeholder variable 318D in the post message 600 as depicted in FIG. 6 at 608C and 608D. The post message 600 may be communicated to an appliance device.

Figure 7:
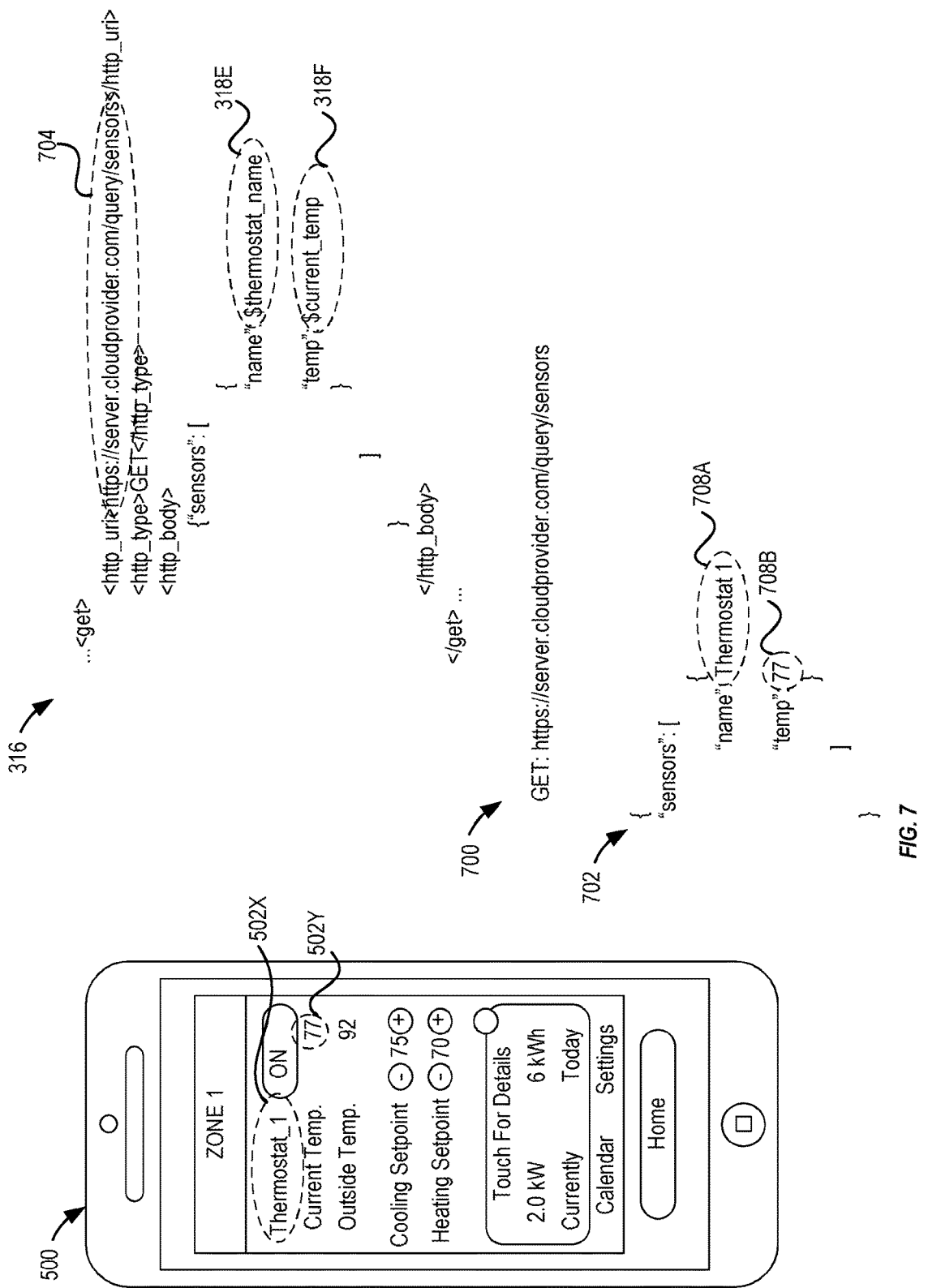
FIG. 7 illustrates an example of getting (e.g., reading) a value from an appliance device based on a portion of the driver model such as the driver model of FIGS. 3A and 3B.

FIG. 7 illustrates an example of getting (e.g., reading) a value from an appliance device based on a portion of the driver model or a verified file that is integrated into a device application module such as the device application module 130. In some embodiments, to get a value on an appliance device, a request message may be sent to an address field included in a get subroutine. The address field may be entered into a driver template by a third party. A response communicated from the appliance device may include values replacing placeholder variables. The response may be parsed and the values may be read from the response and entered into a UI element of a UI page. The placeholder variables may be indicated by a particular character or string of characters.

In some embodiments, parsing the response may include one or more steps. For example, it may be determined whether a format of the response is an expected format and whether the response is format-compliant. White spaces and new lines may be removed, special characters may be replaced with standard encoding, and variable names may be replaced with regular expressions. Using the regular expressions, a value may be matched with body data. In some instances, the value may be extracted using a group. A group may include an XML group following defined rules. For instance, in embodiments in which a value includes a temperature presented as a decimal, the group may be defined as ([0-9]*.[0-9]+). The group may match any decimal number with any number of precision (e.g., it would match 0.0001 or 0.00001, but not 0 or 6 (without decimals)).

In FIG. 7, the UI page 500 of FIG. 5 is depicted along with a portion of the get subroutine 316 of FIG. 3B. Additionally, a get post message 700 and a response 702 are depicted in FIG. 7.

The get post message 700 may include message that is communicated to a device (e.g., device 106) to access one or more values of one or more variables. The get post message 700 may include an HTTP request.

The get subroutine 316 may be written in XML. In some embodiments, other software languages and communication protocols are implemented. The placeholder variables 318E and 318F may be indicated by a "$."

The example in FIG. 7 depicts getting a sensed condition of an example HVAC system. Analogous processes may be implemented in other types of systems. The get post message 700 includes the HTTP request sent to a URI field 704 of the set subroutine 314. The appliance device may communicate the response 702. The response 702 is similar to a portion 706 of the get subroutine 316 except the placeholder variables 318E and 318F of the portion 706 of the get subroutine 316 have been replaced by values 708A and 708B in the response 702. Using the get subroutine 316, the values 708A and 708B may be read and integrated into corresponding UI elements 502X and 502Y of the UI page 500.

For example, a fifth placeholder variable 318E may indicate a sensor name and a sixth placeholder variable 318F may indicate a condition measured by the sensor. In the response, a first value 708A may indicate the sensor name (e.g., "Thermostat_1") of a sensor and a second value 708B may indicate a condition measured by the sensor. A processor (e.g., 230 or the device application module 130 of FIG. 2) knows that the placeholder variables 318E and 318F have been replaced by the values 708A and 708B.

The values 708A and 708B may be read from the response 702 and may be entered into the UI page 500. For example, the first value 708A indicates the sensor, which corresponds to a first thermostat UI element 502X. Similarly, the second value 708B may correspond to a current temp UI element 502Y. The values 708A and 708B may be used to modify or update the UI elements 502X and 502Y.

Figure 8:
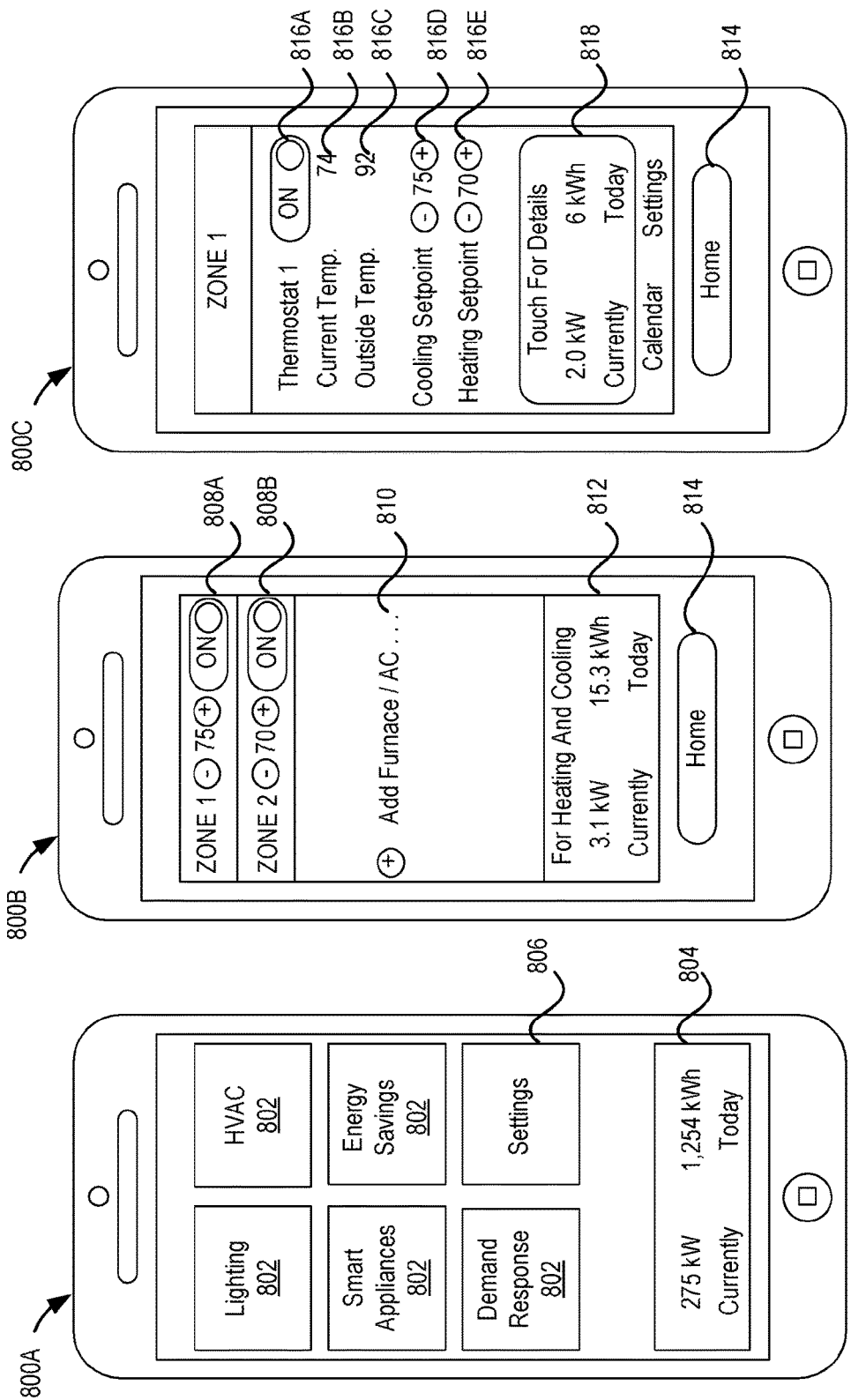
FIGS. 8A-8C illustrate example UI pages based on a driver model such as the driver model of FIGS. 3A and 3B that may be included in a dynamic user interface.

FIGS. 8A-8C illustrate example UI pages 800A-800C (generally UI page 800 or UI pages 800) that may be included in a dynamic user interface such as the dynamic user interface 128 of FIG. 1. The UI pages 800 may be arranged in a hierarchy as explained with respect to FIGS. 8A-8C. There are three UI pages 800 described with reference to FIGS. 8A-8C. In some embodiments, a dynamic user interface may include more than three or less than three UI pages. Moreover, new UI pages 800 may be added in response to new devices and/or device drivers being added. Additionally, UI pages 800 may be deleted based on removal of devices and/or device drivers.

The UI pages 800 are illustrated in FIGS. 8A-8C as being displayed on a smartphone. In other embodiments, the UI pages 800 may be displayed on another computing device or user apparatus (e.g., 112) as described elsewhere herein.

FIG. 8A is an example of a first level UI page 800A. The first level UI page 800A may correspond to a type of a device application module (e.g., the device application module 130). The first level UI page 800A may include multiple UI elements 802 indicating different types of device application modules. Specifically, in the first level UI page 800A the UI elements 802 include an HVAC application module, a lighting application module, a smart appliance module, an energy savings application module, and a DR application module. Additionally, the first level UI page 800A may include a summary UI element 804. The summary UI element 804 in FIG. 8A includes an energy usage summary UI element. Additionally still, the first level UI page 800A may include a setting UI element 806. The setting UI element 806 may navigate a user to a UI page that enables manipulation of one or more settings of a device application module, a user integration module, a server integration module, or another system or module.

FIG. 8B depicts a second level UI page 800B. The second level UI page 800B may be narrower and/or more specific than the first level UI page 800A. The second level UI page 800B may correspond to a particular system. For example, the second level UI page 800B may be displayed in response to a selection of an HVAC UI element 802 in the first level UI page 800A.

The second level UI page 800B may include UI elements 808A and 808B indicating particular sets of the devices 106/118, which may be grouped by location or zone. For example, in the second level UI page 800B of FIG. 8B, a zone 1 UI element 808A may provide some information and enable input of some data into appliance devices in a zone 1. Similarly, a zone 2 UI element 808B may provide some information and enable input of some data into appliance devices in a zone 2. Additionally, selection of the zone 1 UI element 808A or the zone 2 UI element 808B may navigate a user to another UI page.

Additionally, the second level UI page 800B may include an add UI element 810. The add UI element 810 may enable an addition of a zone and/or a UI page corresponding to an added zone. Additionally, the second level UI page 800B may include a summary UI element 812. The summary UI element 812 in FIG. 8B includes an energy usage summary UI element that is limited to energy usage by a HVAC system. Additionally, the second level UI page 800B may include a home UI element 814. The home UI element 814 in FIG. 8B may navigate a user to the first level UI page 800A.

FIG. 8C depicts a third level UI page 800C. The third level UI page 800C may be similar to the UI page 500 discussed elsewhere herein. The third level UI page 800C may be narrower and/or more specific than the first level UI page 800A and the second level UI page 800B. The third level UI page 800C may correspond to a particular zone, which may be a part of a particular system. For example, the third level UI page 800C may be displayed in response to a selection of the zone 1 UI element 808A in the second level UI page 800B.

The third level UI page 800C may include UI elements 816A-816E. Each of the UI elements 816A-816E may correspond to one or more appliance devices. For example, the UI elements 816A-816E may display a condition measured by one or more appliance devices and/or enable user input that may affect a condition of the one or more appliance devices.

Additionally, the third level UI page 800C may include an energy UI element 818. The energy UI element 818 in FIG. 8C includes an energy usage of zone 1. Additionally, the third level UI page 800C may include the home UI element 814.

Figure 9:
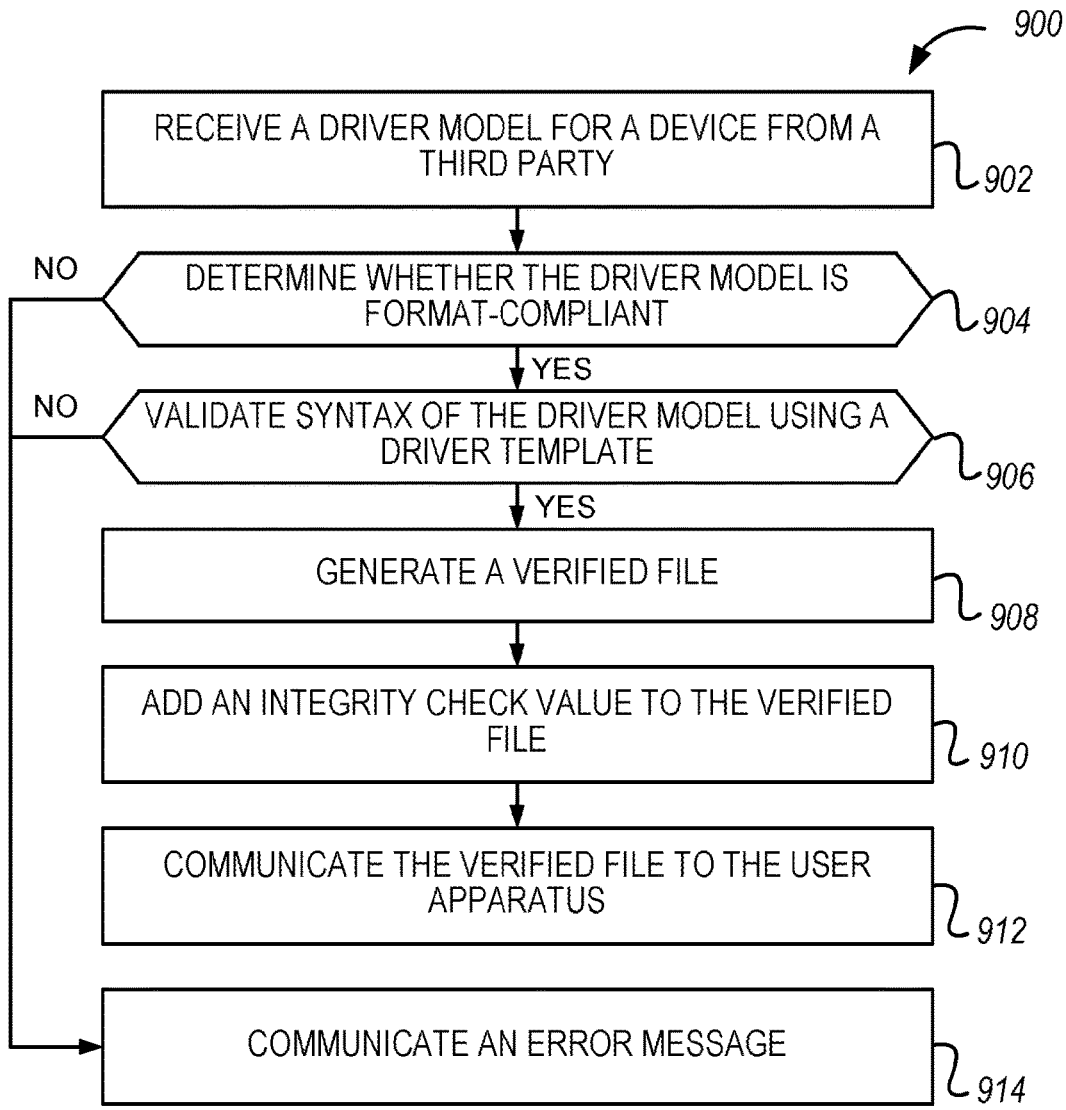
FIG. 9 is a flow diagram of an example method of heterogeneous device driver integration.

FIG. 9 is a flow diagram of an example method 900 of heterogeneous device driver integration, arranged in accordance with at least one embodiment described herein. The method 900 may be programmably performed in some embodiments by the system server 126 described with reference to FIGS. 1 and 2. The system server 126 may include or may be communicatively coupled to one or more non-transitory computer-readable media (e.g., the memory 236 of FIG. 2) having stored thereon or encoded therein programming code or instructions that are executable by a processor to perform or control performance of the method 900. Additionally or alternatively, the system server 126 may include one or more processors (e.g., the processor 230 of FIG. 2) that are configured to execute computer instructions to cause or control performance of the method 900. Although illustrated as discrete blocks, various blocks may be divided into additional blocks, combined into fewer blocks, or eliminated, depending on the desired implementation.

The method 900 may begin at block 902. At block 902, a driver model may be received. The driver model may be configured for a device and may be received from a third party. The driver model may include a list of variables associated with the device and one or more characteristics of the variables.

At block 904, it may be determined whether the driver model is format-compliant. In response to the driver model not being format-compliant ("NO" at block 904), the method 900 may proceed to block 914. In response to the driver model being format-compliant ("YES" at block 904), the method 900 may proceed to block 906.

At block 906, syntax of the driver model may be validated using a driver template. In response to the driver model not being valid ("NO" at block 906), the method 900 may proceed to block 914. In response to the driver model being valid ("YES" at block 906), the method 900 may proceed to block 908.

At block 908, a verified file may be generated. The verified file may be representative of the driver model. The verified file may be formatted to dynamically load on a user apparatus and to dynamically support the device.

In some embodiments, the device includes an appliance device. Additionally, the driver model may also include a get subroutine configured to read values from the appliance device and a set subroutine configured to write values to the appliance device. In these and other embodiments, the generating the verified file may include creating a driver class. The driver class may include at least a portion of a content of the driver model. The driver class may be configured to parse an incoming response communicated by the appliance device in response to execution of the get subroutine and to send a data request to the appliance device using the set subroutine. The generating the verified file may also include synthesizing an executable library including the driver class. For example, the driver model may be formatted in XML. The driver class may then include a JAVA class created from XML content of the driver model. Additionally, the executable library may be formatted in one of .dex, .dll, or .so.

In some embodiments, the verified file may include at least a portion of the driver model formatted to be capable of being integrated in a generic driver class. In addition, in these and other embodiments, the generic driver class may be configured to parse an incoming response communicated by the appliance device in response to execution of the get subroutine and to send data requests to the appliance device using the set subroutine.

In some embodiments, the device may be an input device (e.g., the input device 118 of FIG. 1). In these and other embodiments, the verified file may include the driver model formatted to be capable of being integrated in a generic driver class that is configured to parse a multimodal input. Alternatively, the driver model may include a synthesized executable library including a driver class that is configured to parse an incoming input and that includes at least a portion of a content of the driver model. The driver class may also be configured to adapt to the user. For example, the driver class may be configured to be personalized to the user.

At block 910, the verified file may be communicated to the user apparatus. At block 912, an integrity check value may be added to the verified file. At block 914, an error message may be communicated. For example, the error message may be communicated to the third party.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For example, in some embodiments, the method 900 may include confirming a lack of malicious code in the driver model.

Figure 10:
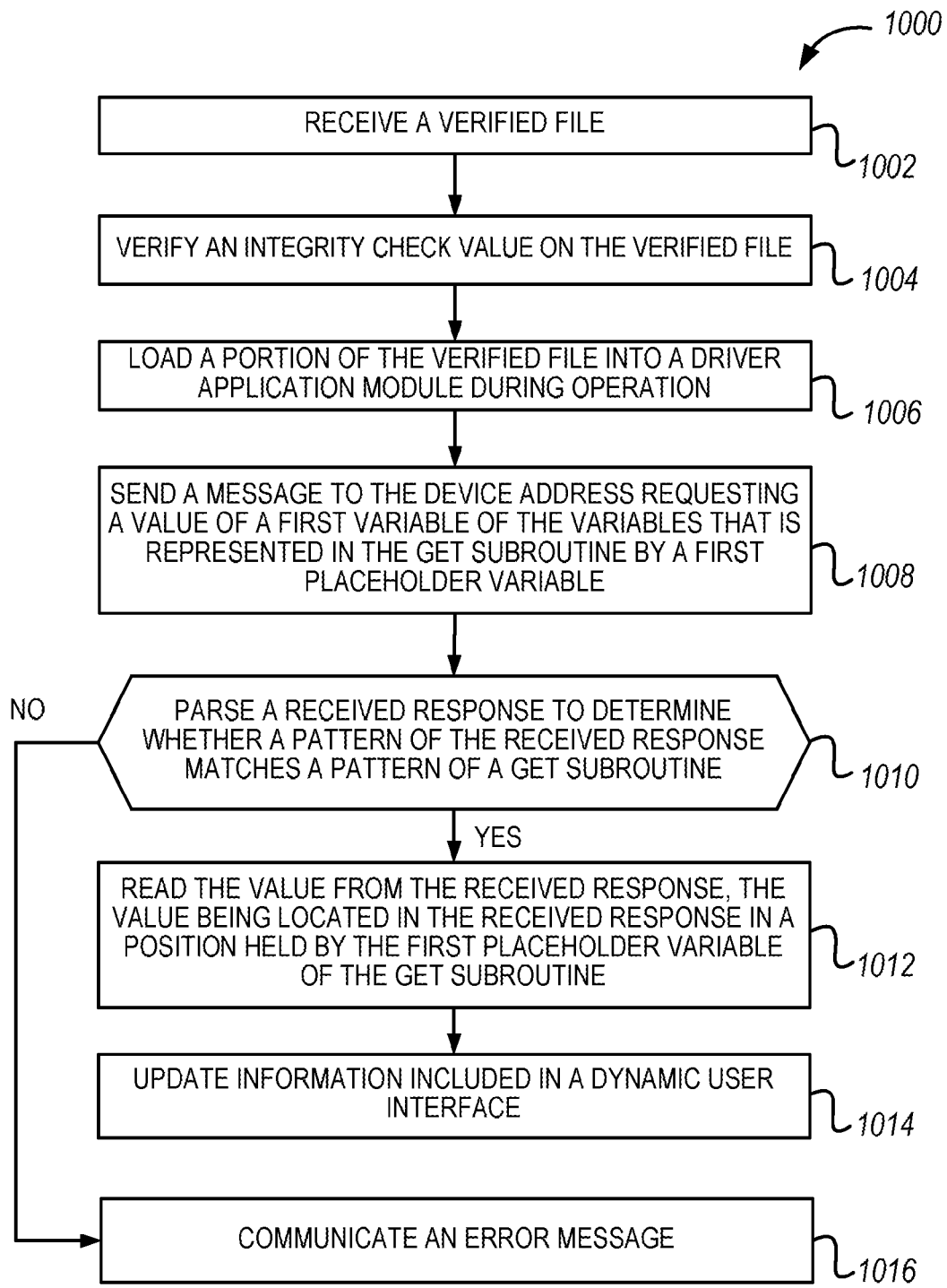
FIG. 10 is a flow diagram of another example method of heterogeneous device driver integration.

FIG. 10 is a flow diagram of another example method 1000 of heterogeneous device driver integration, arranged in accordance with at least one embodiment described herein. The method 1000 may be programmably performed in some embodiments by the user apparatus 112 described with reference to FIGS. 1 and 2. The user apparatus 112 may include or may be communicatively coupled to one or more non-transitory computer-readable media (e.g., the memory 236 of FIG. 2) having stored thereon or encoded therein programming code or instructions that are executable by a processor to perform or control performance of the method 1000. Additionally or alternatively, the user apparatus 112 may include one or more processors (e.g., the processor 230 of FIG. 2) that are configured to execute computer instructions to cause or control performance of the method 1000. Although illustrated as discrete blocks, various blocks may be divided into additional blocks, combined into fewer blocks, or eliminated, depending on the desired implementation.

The method 1000 may begin at block 1002. At block 1002, a verified file may be received. The verified file may be representative of a driver model. The driver model may include a list of variables associated with a device, one or more variable characteristics of one or more of the variables, a get subroutine that is configured to read values from the device, a device address, and one or more placeholder variables.

In some embodiments, the verified file may include an executable library having a driver class synthesized therein. The driver class may further include content of the driver model. The driver class may be configured to parse an incoming response communicated by the device in response to execution of the get subroutine.

In some embodiments, the verified file may include the driver model. The driver model may be capable of being integrated in a generic driver class. The generic driver class may be configured to parse the received response communicated by the device in response to execution of the get subroutine.

At block 1004, an integrity check value on the verified file may be verified. At block 1006, at least some portion of the verified file may be loaded into a driver application module during operation. At block 1008, a message may be sent. The message may be sent to the device address requesting a value of a first variable of the variables that is represented in the get subroutine by a first placeholder variable. At block 1010, a received response may be parsed to determine whether a pattern of the received response matches a pattern of a portion of the get subroutine.

In response to the patterns matching ("YES" at block 1010), the method 1000 may proceed to block 1012. In response to the patterns not matching ("NO" at block 1010), the method 1000 may proceed to block 1016. At block 1012, the value may be read from the received response. The value may be located in the received response in a position previously held by the first placeholder variable of the get subroutine. At block 1014, information included in a dynamic user interface may be updated with the value. At block 1016, an error message may be communicated.

Additionally, in some embodiments the method 1000 may include generating a UI element. The UI element may be included in the dynamic user interface and may be based at least partially on the verified file. In some embodiments, generating the UI element may include generating the UI element based on one or more of a driver type, the variables, and the characteristics of the variables.

Figure 11:
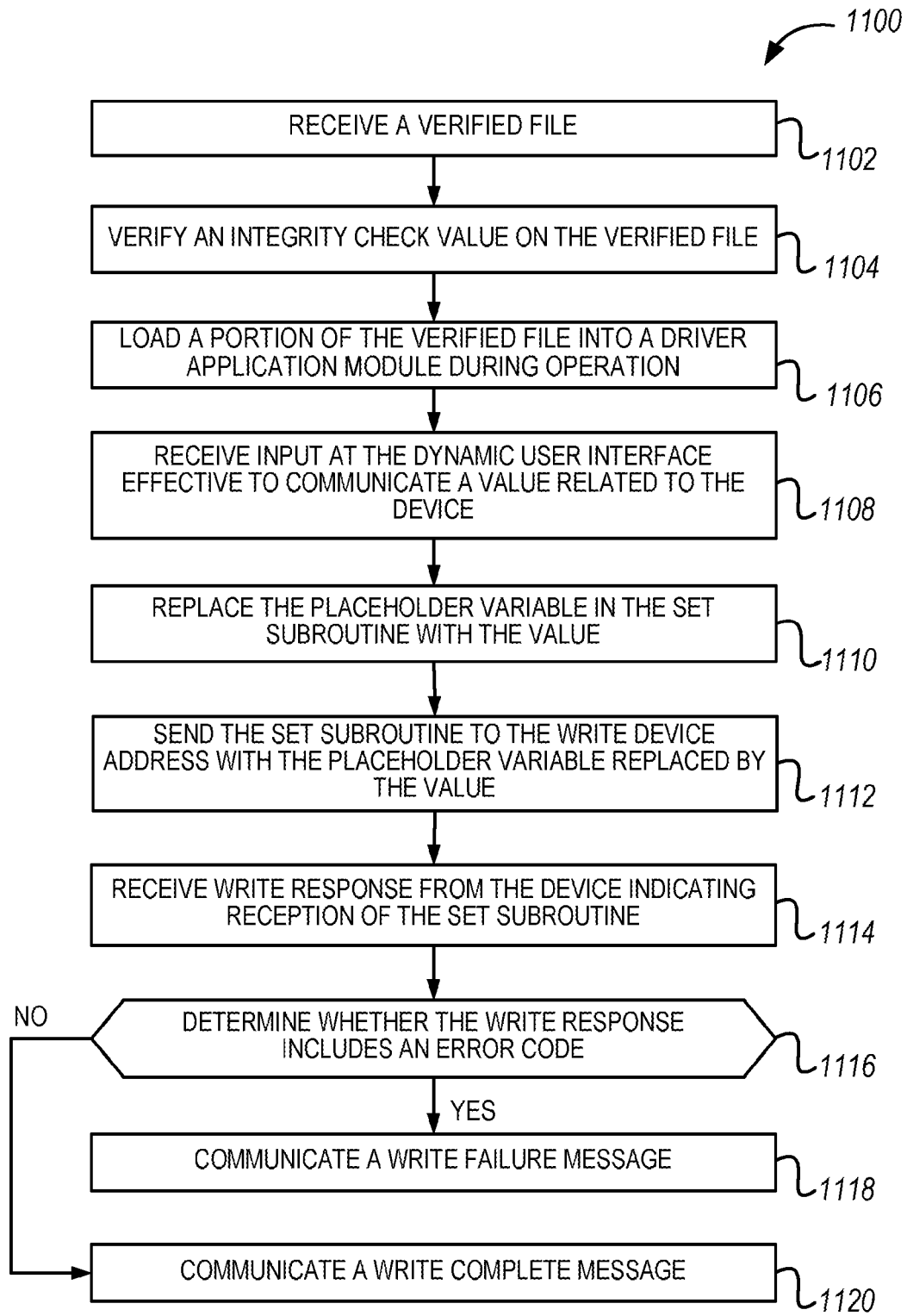
FIG. 11 is a flow diagram of another example method of heterogeneous device driver integration.

FIG. 11 is a flow diagram of another example method 1100 of heterogeneous device driver integration, arranged in accordance with at least one embodiment described herein. The method 1100 may be programmably performed in some embodiments by the user apparatus 112 described with reference to FIGS. 1 and 2. The user apparatus 112 may include or may be communicatively coupled to one or more non-transitory computer-readable media (e.g., the memory 236 of FIG. 2) having stored thereon or encoded therein programming code or instructions that are executable by a processor to perform or control performance of the method 1100. Additionally or alternatively, the user apparatus 112 may include one or more processors (e.g., the processor 230 of FIG. 2) that are configured to execute computer instructions to cause or control performance of the method 1100. Although illustrated as discrete blocks, various blocks may be divided into additional blocks, combined into fewer blocks, or eliminated, depending on the desired implementation.

The method 1100 may begin at block 1102. At block 1102, a verified file may be received. The verified file may be representative of a driver model. The driver model may include a list of variables associated with a device, one or more variable characteristics of one or more of the variables, a set subroutine that is configured to write values to the device and may include a placeholder variable and a write device address.

In some embodiments, the verified file may include an executable library having a driver class synthesized therein. The driver class may further include content of the driver model. The driver class may be configured to send a value request using the set subroutine.

In some embodiments, the verified file may include the driver model. The driver model may be capable of being integrated in a generic driver class. The generic driver class may be configured to send data requests using the set subroutine.

At block 1104, an integrity check value on the verified file may be verified. At block 1106, at least some portion of the verified file may be loaded into a driver application module during operation. At block 1108, an input at the dynamic user interface may be received that is effective to communicate a value related to the device. At block 1110, the placeholder variable may be replaced in the set subroutine with the value. At block 1112, the set subroutine may be sent to the write device address with the placeholder variable replaced by the value.

At block 1114, a write response may be received from the device indicating reception of the set subroutine. At block 1116, it may be determined whether the write response includes an error code. In response to the write response including the error code ("YES" at block 1116), the method 1100 may proceed to block 1118. In response to the write response not including the error code ("NO" at block 1116), the method 1100 may proceed to block 1120. At block 1118, a write failure message may be communicated. At block 1120, a write complete message, may be communicated.

Figure 12:
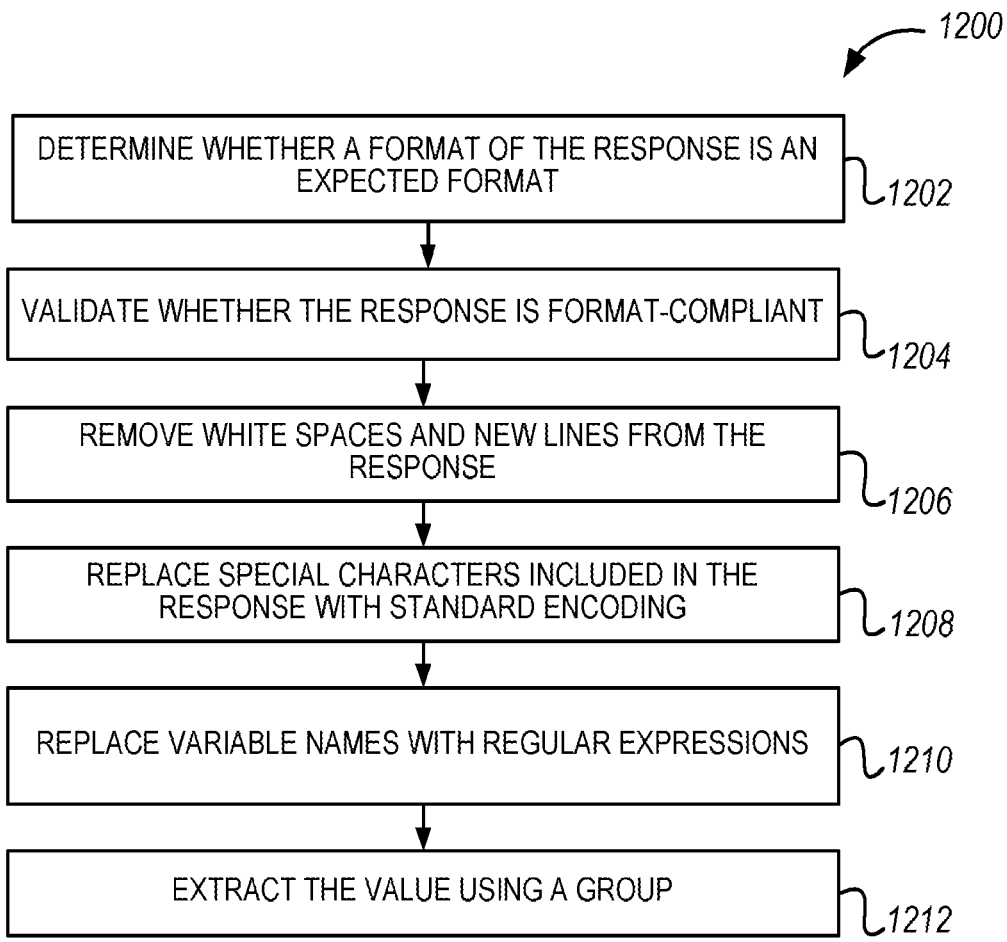
FIG. 12 is a flow diagram of another example method of parsing a received response.

FIG. 12 is a flow diagram of another example method 1200 of parsing a received response, arranged in accordance with at least one embodiment described herein. The method 1200 may be programmably performed in some embodiments by the user apparatus 112 described with reference to FIGS. 1 and 2. The user apparatus 112 may include or may be communicatively coupled to one or more non-transitory computer-readable media (e.g., the memory 236 of FIG. 2) having stored thereon or encoded therein programming code or instructions that are executable by a processor to perform or control performance of the method 1200. Additionally or alternatively, the user apparatus 112 may include one or more processors (e.g., the processor 230 of FIG. 2) that are configured to execute computer instructions to cause or control performance of the method 1200. Although illustrated as discrete blocks, various blocks may be divided into additional blocks, combined into fewer blocks, or eliminated, depending on the desired implementation.

The method 1200 may begin at block 1202. At block 1202, it may be determined whether a format of a received response is an expected format. At block 1204, the response may be validated as being format-compliant. At block 1206, white spaces and new lines may be removed from the response. At block 1208, special characters included in the response may be replaced with standard encoding. At block 1210, variable names may be replaced with regular expressions depending on the variable characteristics associated with the variable further associated with the first placeholder variable.

At block 1212, using the regular expressions, a value may be matched with body data. At block 1214, the value may be extracted using a group. A group may include an XML group following defined rules. For instance, in embodiments in which a value includes a temperature presented to a tolerance of one decimal point. The group may be defined as ([0-9]*.[0-9]+).

Figure 13A:
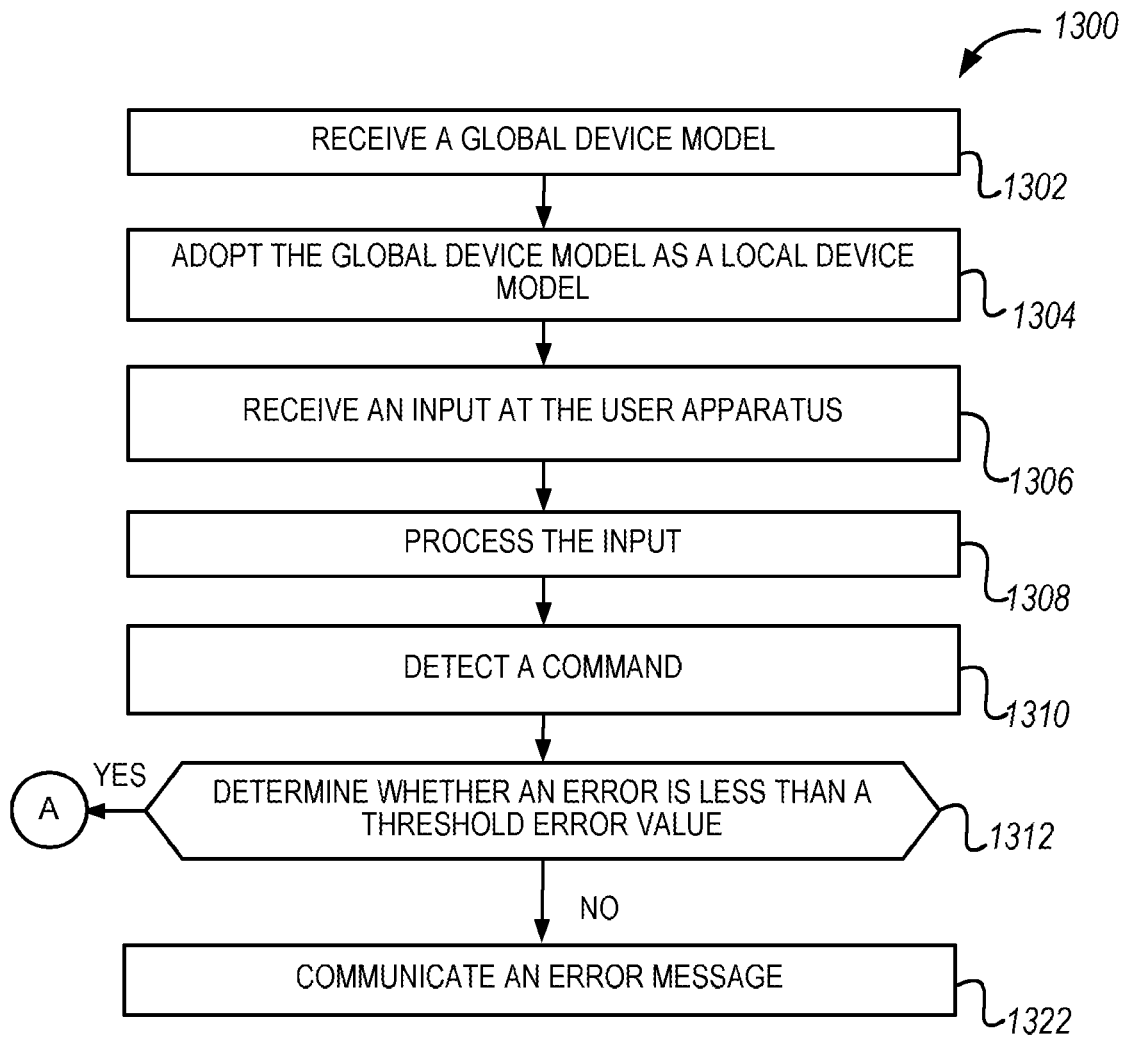
FIGS. 13A and 13B are a flow diagram of an example method of dynamically updating a device driver, all arranged in accordance with at least one embodiment described herein.
Figure 13B:
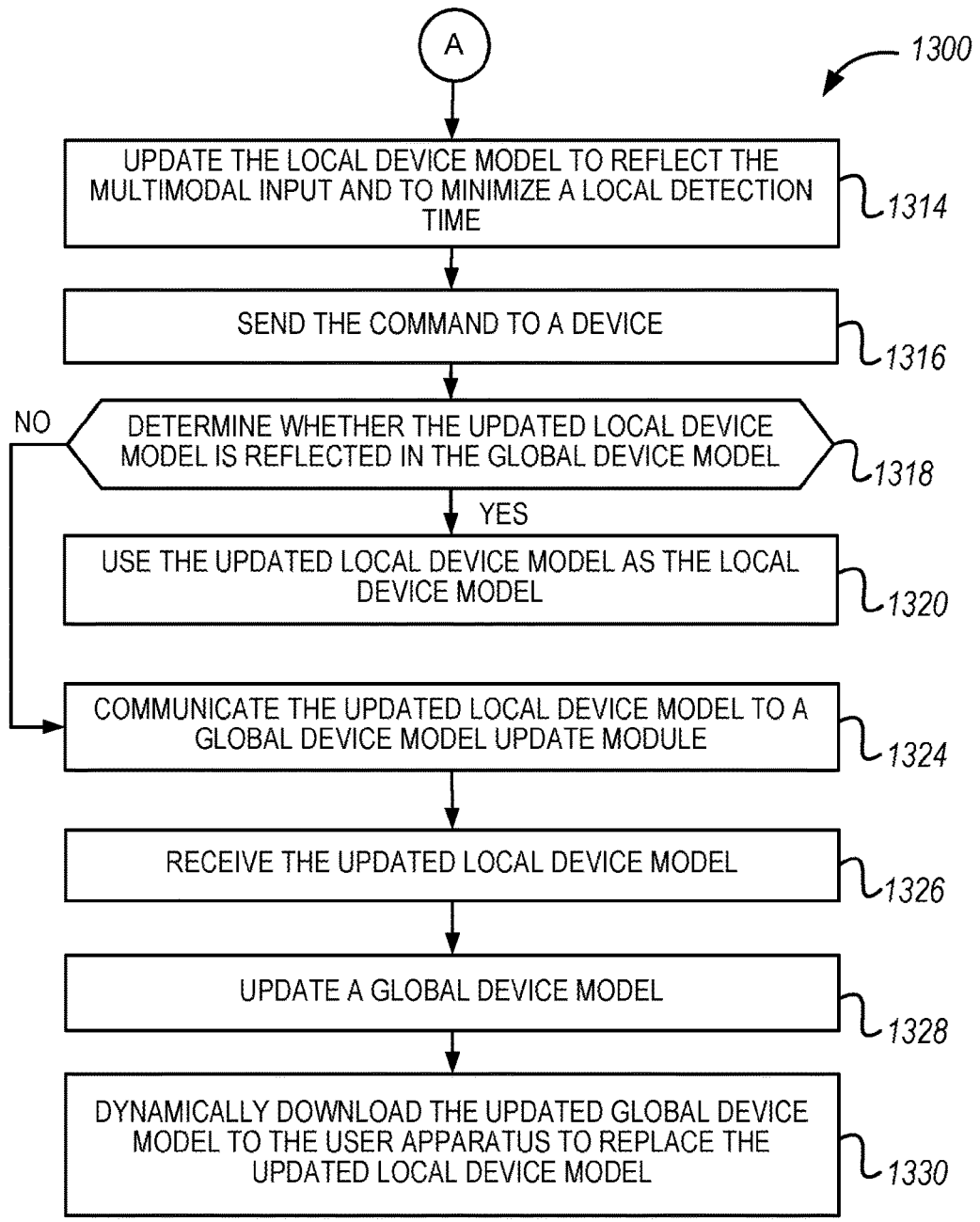

FIGS. 13A and 13B are a flow diagram of an example method 1300 of dynamically updating a device driver, arranged in accordance with at least one embodiment described herein. The method 1300 may be programmably performed in some embodiments by the user apparatus 112 and/or the system server 126 described with reference to FIGS. 1 and 2. The user apparatus 112 and/or the system server 126 may include or may be communicatively coupled to one or more non-transitory computer-readable media (e.g., the memory 236 of FIG. 2) having stored thereon or encoded therein programming code or instructions that are executable by a processor to perform or control performance of the method 1300. Additionally or alternatively, the user apparatus 112 and/or the system server 126 may include one or more processors (e.g., the processor 230 of FIG. 2) that are configured to execute computer instructions to cause or control performance of the method 1300. Although illustrated as discrete blocks, various blocks may be divided into additional blocks, combined into fewer blocks, or eliminated, depending on the desired implementation.

With reference to FIG. 13A, the method 1300 may begin at block 1302. At block 1302, a global device model may be received. At block 1304, the global device model may be adopted as a local device model. At block 1306, a multimodal input may be received. For example, the multimodal input may be received at a user apparatus from an input device linked to the user apparatus. At block 1308, the multimodal input may be processed. At block 1310, a command may be detected. In some embodiments, the command may be detected based on a processed multimodal input and the adopted local device model.

At block 1312, it may be determined whether an error is less than a threshold error value. In response to the error being greater than the threshold error value ("NO" at block 1312), the method 1300 may proceed to block 1322 in which an error message may be communicated. The error message may be communicated to a user to prompt the user to repeat the multimodal input.

In response to the error being less than the threshold error value ("YES" at block 1312), the method 1300 may proceed to block 1314. With reference to FIG. 13B, at block 1314, the local device model may be updated to reflect the multimodal input and to minimize an error rate. Minimizing the error rate may personalize a local device model to a user. At block 1316, the command may be sent to a device.

At block 1318, it may be determined whether the updated local device model is reflected in the global device model. In response to the updated local device model being reflected in the global device model ("YES" at block 1318), the method 1300 may proceed to block 1320. At block 1320, the updated local device model may be used as the local device model.

In response to the updated local device model not being reflected in the global device model ("NO" at block 1318), the method 1300 may proceed to block 1324. At block 1324, the updated local device model may be communicated to a global device model update module. At block 1326, an updated local device model may be received from the user apparatus. At block 1328, a global device model may be updated. The global device model may be updated to minimize an error rate of the multimodal input received at the input device. The update may be based at least partially on the updated local device model. At block 1330, the updated global device model may be dynamically downloaded to the user apparatus to replace the updated local device model.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What we claim is:

1. A method comprising:
   receiving a driver model for a device from a third party, wherein the driver model is generated based on a driver template for the device that is accessible to the third party; the driver model is formatted to be capable of integration in a generic driver class that is configured to parse an input and adapt to a characteristic of a user; and the driver model includes a device type of the device, a list of variables associated with the device and one or more characteristics of the variables added to the driver template;
   determining whether the driver model is format-compliant;
   validating syntax of the driver model based at least partially on the driver template from which the driver model is generated;
   in response to the driver model being format-compliant and the syntax being valid:
   generating a verified file that is representative of the driver model, the verified file being formatted to dynamically load into a device application module during operation and to dynamically support the device;
   adding an integrity check value to the verified file; and
   communicating the verified file to a user apparatus that includes the device application module; and
   in response to the driver model being format-noncompliant or the syntax being invalid, communicating an error message.

2. The method of claim 1, wherein:
   the device includes an appliance device; and
   the driver model further includes a get subroutine configured to read values of one or more of the variables from the appliance device and a set subroutine configured to write values of one or more of the variables to the appliance device.

3. The method of claim 2, wherein the generating a verified file includes:
   creating the generic driver class including at least a portion of a content of the driver model, wherein the generic driver class is configured to parse an incoming response communicated by the appliance device in response to execution of the get subroutine and to send a data request to the appliance device using the set subroutine; and
   synthesizing an executable library including the generic driver class.

4. The method of claim 2, wherein:
the verified file includes at least a portion of the driver model formatted for integration in the generic driver class; and
the generic driver class is configured to parse an incoming response communicated by the appliance device in response to execution of the get subroutine and to send data requests to the appliance device using the set subroutine.

5. The method of claim 1, wherein:
the device includes an input device; and
the verified file includes
a synthesized executable library including a driver class that is configured to parse an incoming input and that includes at least a portion of a content of the driver model.

6. A method comprising:
receiving a verified file that is representative of a driver model, the verified file including a list of variables associated with a device, one or more variable characteristics of one or more of the variables, a get subroutine that is configured to read values from the device, a device address, and one or more placeholder variables;
loading at least some portion of the verified file into a driver application module during operation;
generating a user interface (UI) element of a dynamic user interface based at least partially on one variable of the list of variables of the verified file, wherein the dynamic user interface is configured to display information and data related to one or more appliance devices and enables input of a command related to the one or more of the appliance devices and the generated UI element is configured for input reception functionality in the dynamic user interface;
sending a message to the device address requesting a value of a first variable of the variables that is represented in the get subroutine by a first placeholder variable;
parsing a received response to determine whether a pattern of the received response matches a pattern of the get subroutine; and
in response to the patterns matching, reading the value from the received response, the value being located in the received response in a position previously held by the first placeholder variable in the get subroutine and updating information included in a dynamic user interface with the value.

7. The method of claim 6, wherein the verified file includes a set subroutine that is configured to write values to the device and includes a second placeholder variable and a write device address, the method further comprising:
receiving input at the user interface effective to communicate a second value related to the device;
replacing the second placeholder variable in the set subroutine with the second value; and
sending the set subroutine to the write device address with the second placeholder variable replaced by the second value.

8. The method of claim 7, wherein:
the verified file includes an executable library having a driver class synthesized therein;
the driver class further includes content of the driver model; and
the driver class is configured to parse an incoming response communicated by the device in response to execution of the get subroutine and to send a value request using the set subroutine.

9. The method of claim 7, wherein:
the verified file includes the driver model that is capable of being integrated in a generic driver class; and
the generic driver class is configured to parse an incoming response communicated by the device in response to execution of the get subroutine and to send data requests using the set subroutine.

10. The method of claim 6, wherein the parsing includes:
determining whether a format of the received response is in an expected format;
validating whether the received response is format-compliant;
removing white spaces and new lines from the received response;
replacing special characters included in the received response with standard encoding;
depending on the variable characteristics associated with the first variable that is further associated with the first placeholder variable, replacing variable names with regular expressions;
using the regular expressions, matching the value with body data; and
extracting the value using one or more groups.

11. A non-transitory computer-readable medium having encoded therein programming code executable by one or more processors to perform or control performance of operations comprising:
receiving a driver model for a device from a third party, wherein the driver model is generated based on a driver template for the device that is accessible to the third party; the driver model is formatted to be capable of integration in a generic driver class that is configured to parse an input and adapt to a characteristic of a user; and the driver model includes a device type of the device, a list of variables associated with the device and one or more characteristics of the variables added to the driver template;
determining whether the driver model is format-compliant;
validating syntax of the driver model based at least partially on the driver template from which the driver model is generated;
in response to the driver model being format-compliant and the syntax being valid:
generating a verified file that is representative of the driver model, the verified file being formatted to dynamically load into a device application module during operation and to dynamically support the device;
adding an integrity check value to the verified file; and
communicating the verified file to a user apparatus that includes the device application module; and
in response to the driver model being format-noncompliant or the syntax being invalid, communicating an error message.

12. The non-transitory computer-readable medium of claim 11, wherein:
the device includes an appliance device; and
the driver model further includes a get subroutine configured to read values from the appliance device and a set subroutine configured to write values to the appliance device.

13. The non-transitory computer-readable medium of claim 12, wherein the generating a verified file includes:

creating the generic driver class including at least a portion of a content of the driver model, wherein the generic driver class is configured to parse an incoming response communicated by the appliance device in response to execution of the get subroutine and to send a data request to the appliance device using the set subroutine; and synthesizing an executable library including the generic driver class.

14. The non-transitory computer-readable medium of claim 12, wherein:

the verified file includes at least a portion of the driver model formatted for integration in the generic driver class; and the generic driver class is configured to parse an incoming response communicated by the appliance device in response to execution of the get subroutine and to send data requests to the appliance device using the set subroutine.

15. The non-transitory computer-readable medium of claim 11, wherein:

the device includes an input device; and the verified file includes a synthesized executable library including a driver class that is configured to parse an incoming multimodal input communicated by the input device to the user apparatus and that includes at least a portion of a content of the driver model.

16. A non-transitory computer-readable medium having encoded therein programming code executable by one or more processors to perform or control performance of operations comprising:

receiving a verified file that is representative of a driver model, the verified file including a list of variables associated with a device, one or more variable characteristics of one or more of the variables, a get subroutine that is configured to read values from the device, a device address, and one or more placeholder variables;

loading at least some portion of the verified file into a driver application module during operation;

generating a user interface (UI) element of a dynamic user interface based at least partially on one variable of the list of variables of the verified file, wherein the dynamic user interface is configured to display information and data related to one or more appliance devices and enables input of a command related to the one or more appliance devices and the generated UI element is configured for input reception functionality in the dynamic user interface;

sending a message to the device address requesting a value of a first variable of the variables that is represented in the get subroutine by a first placeholder variable;

parsing a received response to determine whether a pattern of the received response matches a pattern of the get subroutine; and in response to the patterns matching, reading the value from the received response, the value being located in the received response in a position previously held by the first placeholder variable in the get subroutine and updating information included in a dynamic user interface with the value.

17. The non-transitory computer-readable medium of claim 16, wherein:

the driver model includes a set subroutine that is configured to write values to the device and includes a second placeholder variable, and a write device address, and the operations further comprise:

receiving input at the user interface effective to communicate a second value related to the device;

replacing the second placeholder variable in the set subroutine with the second value; and sending the set subroutine to the write device address with the second placeholder variable replaced by the second value.

18. The non-transitory computer-readable medium of claim 17, wherein:

the verified file includes an executable library having a driver class synthesized therein;

the driver class further includes content of the driver model; and the driver class is configured to parse an incoming response communicated by the device in response to execution of the get subroutine and to send a value request using the set subroutine.

19. The non-transitory computer-readable medium of claim 17, wherein:

the verified file includes the driver model that is capable of being integrated in a generic driver class; and the generic driver class is configured to parse an incoming response communicated by the device in response to execution of the get subroutine and to send data requests using the set subroutine.

20. The non-transitory computer-readable medium of claim 16, wherein the parsing includes:

determining whether a format of the received response is in an expected format;

validating whether the received response is format-compliant;

removing white spaces and new lines from the received response;

replacing special characters included in the received response with standard encoding;

depending on the variable characteristics associated with the first variable that is further associated with the first placeholder variable, replacing variable names with regular expressions;

using the regular expressions, matching the value with body data; and extracting the value using one or more groups.

* * * * *